US012707461B2

(12) United States Patent
Xiong et al.

(10) Patent No.: US 12,707,461 B2
(45) Date of Patent: Aug. 11, 2026

(54) CONFIGURED GRANT-BASED UPLINK TRANSMISSION WITH TRANSPORT BLOCK (TB) PROCESSING OVER MULTIPLE SLOTS

(71) Applicant: Intel Corporation, Santa Clara, CA (US)

(72) Inventors: Gang Xiong, Portland, OR (US); Debdeep Chatterjee, San Jose, CA (US); Yingyang Li, Santa Clara, CA (US); Sergey Sosnin, Santa Clara, CA (US); Gregory Ermolaev, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 18/558,319

(22) PCT Filed: Sep. 7, 2022

(86) PCT No.: PCT/US2022/042711
§ 371 (c)(1),
(2) Date: Oct. 31, 2023

(87) PCT Pub. No.: WO2023/048937
PCT Pub. Date: Mar. 30, 2023

(65) Prior Publication Data

US 2024/0224270 A1 Jul. 4, 2024

Related U.S. Application Data

(60) Provisional application No. 63/351,559, filed on Jun. 13, 2022, provisional application No. 63/339,849, filed on May 9, 2022, provisional application No. 63/304,214, filed on Jan. 28, 2022, provisional application No. 63/256,423, filed on Oct. 15, 2021, provisional application No. 63/248,855, filed on Sep. 27, 2021.

(51) Int. Cl.
*H04W 72/1268* (2023.01)
*H04B 7/06* (2006.01)
(Continued)

(52) U.S. Cl.
CPC ...... *H04W 72/1268* (2013.01); *H04B 7/0626* (2013.01); *H04W 72/0446* (2013.01); *H04W 72/232* (2023.01)

(58) Field of Classification Search
None
See application file for complete search history.

(56) References Cited

U.S. PATENT DOCUMENTS

2021/0274493 A1 9/2021 Papasakellariou
2024/0073874 A1* 2/2024 Su .......................... H04L 1/189
(Continued)

OTHER PUBLICATIONS

International Patent Office—International Search Report and Written Opinion mailed Dec. 22, 2022 from International Patent Application No. PCT/US2022/042711, 10 pages.
(Continued)

*Primary Examiner* — Mohammad S Adhami
(74) *Attorney, Agent, or Firm* — Schwegman Lundberg & Woessner, P.A.

(57) ABSTRACT

Various embodiments herein provide techniques related to identifying, when a user equipment (UE) is in a fifth generation (5G) or new radio (NR) cellular network, a data that is to be transmitted in a transport block over multiple slots (TBoMS) in a configured grant (CG) physical uplink shared channel (PUSCH); identifying, based on an indication received from a base station, a number of repetitions for transmission of the PUSCH; and transmitting, based on the indication, the TBoMS in the PUSCH over the multiple slots. Other embodiments may be described and/or claimed.

13 Claims, 13 Drawing Sheets

(51) Int. Cl.
*H04W 72/0446* (2023.01)
*H04W 72/232* (2023.01)

(56) References Cited

U.S. PATENT DOCUMENTS

2024/0179700 A1* 5/2024 Su .......................... H04L 1/189
2024/0188087 A1* 6/2024 Zhou .................... H04L 1/1664

OTHER PUBLICATIONS

Zte, "Discussion on TB processing over multi-slot PUSCH," 3GPP TSG RAN WG1 #106-e, R1-2106740, Agenda item: 8.8.1.2, Aug. 16-Aug. 27, 2021, e-Meeting, 7 pages.
Qualcomm Incorporated, "TB Processing over multi-slot PUSCH," 3GPP TSG-RAN WG1 Meeting #106-e, R1-2107360, Agenda item: 8.8.1.2, Aug. 16-27, 2021, e-Meeting, 9 pages.
Intel Corporation, "Discussion on TB processing over multi-slot PUSCH," 3GPP TSG RAN WG1 #106-e, R1-2107603, Agenda item: 8.8.1.2, Aug. 16-27, 2021, e-Meeting, 8 pages.
Huawei, et al., "Discussion on TB processing over multi-slot PUSCH," 3GPP TSG RAN WG1 Meeting #106-e, R1-2106496, Agenda Item: 8.8.1.2, Aug. 16-27, 2021, E-meeting, 12 pages.
3GPP, "Technical Specification Group Radio Access Network; NR; Physical layer procedures for data (Release 16)," 3GPP TS 38.214 V16.6.0 (Jun. 2021), 5G, 172 pages.
"International Application Serial No. PCT/US2022/042711, International Preliminary Report on Patentability mailed Apr. 11, 2024", 6 pgs.

* cited by examiner

UE 702
Uu
RAN 704
AN 708
AP 706
LTE RAN 710
eNB 712
CN 720
Application/Content Server 738
DN 736
LTE CN 722
MME 724
SGSN 728
HSS 730
S3
S6a
S11
SGW 726
S5
PGW 732
Gx
PCRF 734
Gx
To DN
SGi
To DN
To RAN
S1-MME
To RAN
S1-U
NG-RAN 714
gNB 716
Xn
ng-eNB 718
NG
NG
5GC 740
AUSF 742
N12
AMF 744
N11
SMF 746
N4
UPF 748
N6
To DN
To UE
To RAN
N1
N2
N3
N13
Nausf
Namf
N8
N15
N22
Nsmf
N7
N10
N22
Nnssf
NSSF – 750
Nnef
NEF – 752
Nnrf
NRF – 754
N15
N7
Npcf
PCF – 756
N5
N8
N10
N13
Nudm
UDM – 758
Nnaf
AF – 760
700

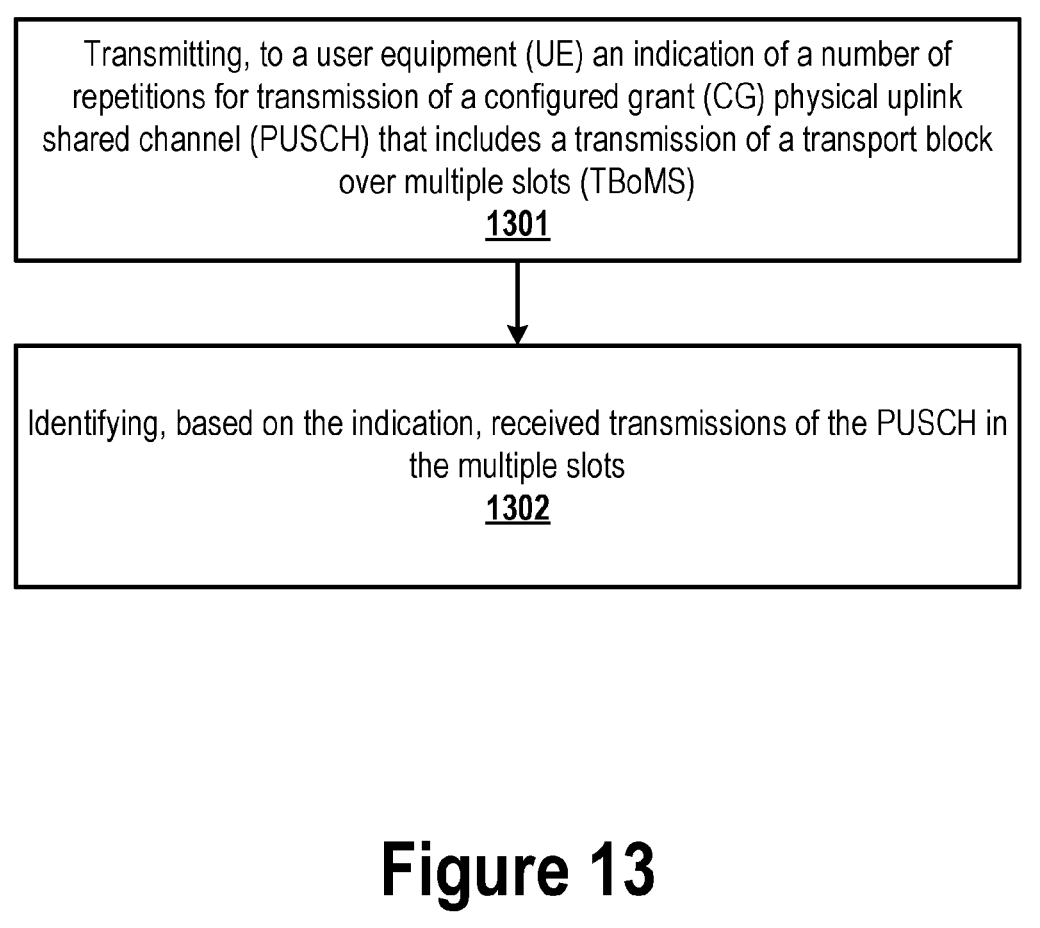

Transmitting, to a user equipment (UE) an indication of a number of repetitions for transmission of a configured grant (CG) physical uplink shared channel (PUSCH) that includes a transmission of a transport block over multiple slots (TBoMS)
1301

Identifying, based on the indication, received transmissions of the PUSCH in the multiple slots
1302

Figure 13

CONFIGURED GRANT-BASED UPLINK TRANSMISSION WITH TRANSPORT BLOCK (TB) PROCESSING OVER MULTIPLE SLOTS

CROSS REFERENCE TO RELATED APPLICATION

The present application is a national phase entry under 35 U.S.C. § 371 of International Application No. PCT/US2022/042711, filed Sep. 7, 2022, entitled "CONFIGURED GRANT-BASED UPLINK TRANSMISSION WITH TRANSPORT BLOCK (TB) PROCESSING OVER MULTIPLE SLOTS," which claims priority to U.S. Provisional Patent Application No. 63/248,855, which was filed Sep. 27, 2021; U.S. Provisional Patent Application No. 63/256,423, which was filed Oct. 15, 2021; U.S. Provisional Patent Application No. 63/304,214, which was filed Jan. 28, 2022; U.S. Provisional Patent Application No. 63/339,849, which was filed May 9, 2022; and to U.S. Provisional Patent Application No. 63/351,559, which was filed Jun. 13, 2022, the entire disclosures of which are hereby incorporated by reference.

FIELD

Various embodiments generally may relate to the field of wireless communications. For example, some embodiments may relate to grant-based uplink (UL) transmission with transport block (TB) processing over multiple slots.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 13 depicts an alternative example procedure for practicing the various embodiments discussed herein.

DETAILED DESCRIPTION

Figure 1:
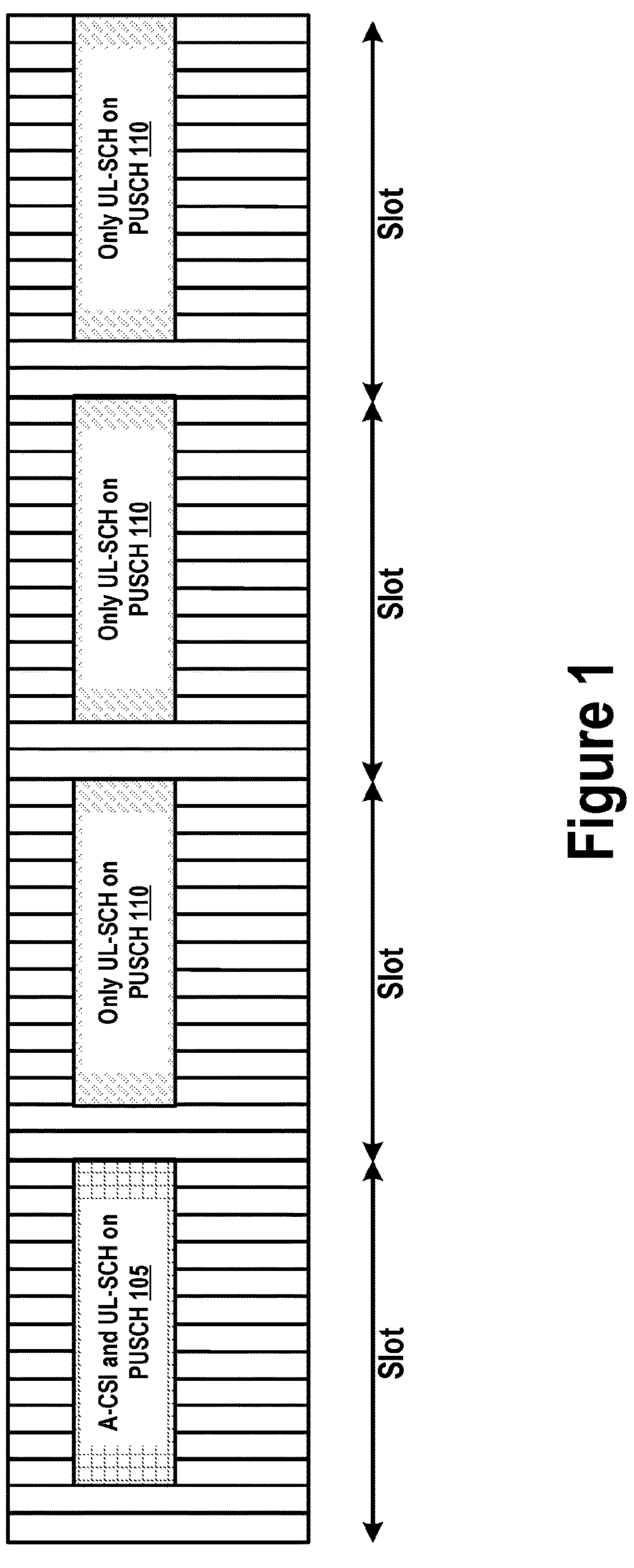
FIG. 1 illustrates an example of aperiodic channel state information (A-CSI) on single-slot physical uplink shared channel (PUSCH) with repetition, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Mobile communication has evolved significantly from early voice systems to highly-sophisticated integrated communication platform. The next generation wireless communication system, fifth generation (5G) (which may also be referred to as new radio (NR)) may provide access to information and sharing of data by various users and applications. NR may be a unified network/system that targets to meet vastly different and sometime conflicting performance dimensions and services. Such diverse multi-dimensional requirements may driven by different services and applications. In general, NR may evolve based on third generation partnership project (3GPP) long term evolution (LTE(-Advanced with additional potential new Radio Access Technologies (RATs) to enrich people lives with better, simple and seamless wireless connectivity solutions. NR may enable connection by wireless and deliver fast, rich contents and services.

For cellular systems, coverage may be an important factor for successful operation. Compared to LTE. NR may be deployed at relatively higher carrier frequency in frequency range 1 (FR1), e.g., at 3.5 gigahertz (GHz). In this case, coverage loss is expected due to larger path-loss, which may make it more challenging to maintain an adequate quality of service. Typically, uplink coverage is the bottleneck for system operation considering the low transmit power at the user equipment (UE) side.

In the 3GPP Release-15 (Rel-15) specifications, which may relate to NR, a number of repetitions can be configured for the transmission of the physical uplink shared channel (PUSCH) to help improve the coverage performance. When repetition is employed for the transmission of the physical uplink control channel (PUCCH) and/or PUSCH, the same time domain resource allocation (TDRA) may be used in each slot. Further, inter-slot frequency hopping can be configured to improve the performance by exploiting frequency diversity. In the 3GPP Release-16 (Rel-16) specifications, the number of repetitions for PUSCH may be dynamically indicated in the downlink control information (DCI).

In addition, in NR Rel-15, a transport block (TB) carried by a PUSCH may be scheduled within a slot. In this case, resource allocation of one data transmission may be confined with a slot. In this case, transport block size (TBS) may be determined based on the number of resource elements (REs) in a slot. To maintain a low code rate, a TB may span more than one slots, where a smaller number of physical resource blocks (PRBs) may be allocated in frequency to improve link budget for PUSCH transmission. In this case, TBS may be determined based on the number of allocated slots for the processing of TBoMS. Following the same design principle for single-slot PUSCH repetition type A, the same time domain resource allocation may be allocated for each slot for TBoMS transmission.

Note that, as defined in Rel-15, for configured grant (which may also be referred to as "CG") single-slot PUSCH with repetition, for a redundancy version (RV) sequence, the repetitions may be terminated after transmitting K repetitions, or at the last transmission occasion among the K repetitions within the period P, or from the starting symbol of the repetition that overlaps with a PUSCH with the same hybrid automatic repeat request (HARQ) process scheduled by DCI format 0_0, 0_1 or 0_2, whichever is reached first. In this case, when configured grant based TBoMS is employed, certain mechanisms may need to be updated for the termination of TBoMS repetitions.

Further, in Rel-15, if PUSCH slot aggregation is enabled, A-CSI may be multiplexed only in the PUSCH in the first slot. In addition, an A-CSI report triggered by DCI on PUSCH repetition Type B without uplink shared channel (UL-SCH) may be carried on the first nominal repetition with the other nominal repetitions discarded. CSI report triggered by DCI on PUSCH repetition Type B with UL-SCH is carried on the first actual repetition.

FIG. 1 illustrates one example of A-CSI on PUSCH with repetition. In the figure, A-CSI is only multiplexed with UL-SCH on the first PUSCH repetition at 105. The remaining PUSCH repetitions at 110 may include only the UL-SCH as shown. Note that, although PUSCH repetition type A is shown in FIG. 1, the same mechanism may be applied for PUSCH repetition type B.

Note that when TBoMS is scheduled and when A-CSI report is triggered and multiplexed on the TBoMS, it may be desirable to define a mechanism related to the multiplexing rule for A-CSI on TBoMS, which may also depend on whether UL-SCH is carried on the TBoMS.

Embodiments herein relate to mechanisms on configured grant based uplink transmission with TB processing over multiple slots. In particular, embodiments may relate to one or more of the following:

Configured grant based TBoMS: and

A-CSI multiplexing mechanism on TBoMS

Note that in the following description, "PUSCH transmission carrying a TB which spans more than one slots" may be combined with PUSCH transmission with repetition or without repetition. Further, PUSCH carrying a TB which spans multiple slots may be referred to "mPUSCH" or "TBoMS".

Configured Grant Based TBoMS

As mentioned above, in the 3GPP Rel-15 specifications, a transport block (TB) carried by a PUSCH may be scheduled within a slot. In this case, resource allocation of one data transmission is confined with a slot. In this case, TBS may be determined based on the number of REs in a slot. To maintain a low code rate, a transport block may span more than one slots, where a smaller number of PRBs may be allocated in frequency so as to improve link budget for PUSCH transmission. In this case, TBS may be determined based on the number of allocated slots for the TBoMS. Following the same design principle for single-slot PUSCH repetition type A, the same time domain resource allocation may be allocated for each slot for TBoMS transmission.

Note that as defined in Rel-15, for configured grant single-slot PUSCH with repetition, for a RV sequence, the repetitions may be terminated after transmitting K repetitions, or at the last transmission occasion among the K repetitions within the period P, or from the starting symbol of the repetition that overlaps with a PUSCH with the same HARQ process scheduled by DCI format 0_0, 0_1 or 0_2, whichever is reached first. In this case, when configured grant based TBoMS is employed, certain mechanisms may need to be updated for the termination of repetition of a single TBoMS transmission.

Embodiments of configured grant based TB processing over multiple slots (TBoMS) are provided as follows:

In one embodiment, for configured grant based TBoMS transmission, the repetitions shall be terminated after transmitting K TBoMS repetitions, or at the last whole transmission occasion among the K repetitions within the period P, or from the starting symbol of the repetition that overlaps with a PUSCH with the same HARQ process scheduled by DCI format 0_0, 0_1 or 0_2, whichever is reached first. Here, for the last condition, a repetition of a TBoMS may be interpreted to overlap with the PUSCH with the same HARQ process scheduled by DCI format 0_0, 0_1, or 0_2 if the dynamically granted is scheduled in one or more symbols that occur within the overall duration of the repetition of the TBoMS that may span multiple slots, including slots that may not be available for mapping of the TBoMS. In other words, the dynamically granted PUSCH may be scheduled in a slot that may be unavailable for TBoMS mapping.

Further, in an example, for the last condition above, the starting symbol of a TBoMS repetition may correspond to the first symbol of the TBoMS-based PUSCH in the first available slot to which the repetition of the TBoMS is mapped. In another example, for the last condition above, the starting symbol of a TBoMS repetition may correspond to the first symbol of the TBoMS-based PUSCH in the available slot in which the dynamically granted PUSCH is scheduled or the earliest slot available for TBoMS mapping after the slot in which the dynamically granted PUSCH is scheduled if the dynamically granted PUSCH is scheduled in a slot that is not available for TBoMS-based PUSCH transmission.

For this option, termination occurs after the last whole TBoMS repetition among K repetitions within the period P. Note that TBoMS repetition is transmitted based on the available slots. In this case, if only part of a TBoMS repetition is within the period P, then this TBoMS repetition is not transmitted.

Figure 2:
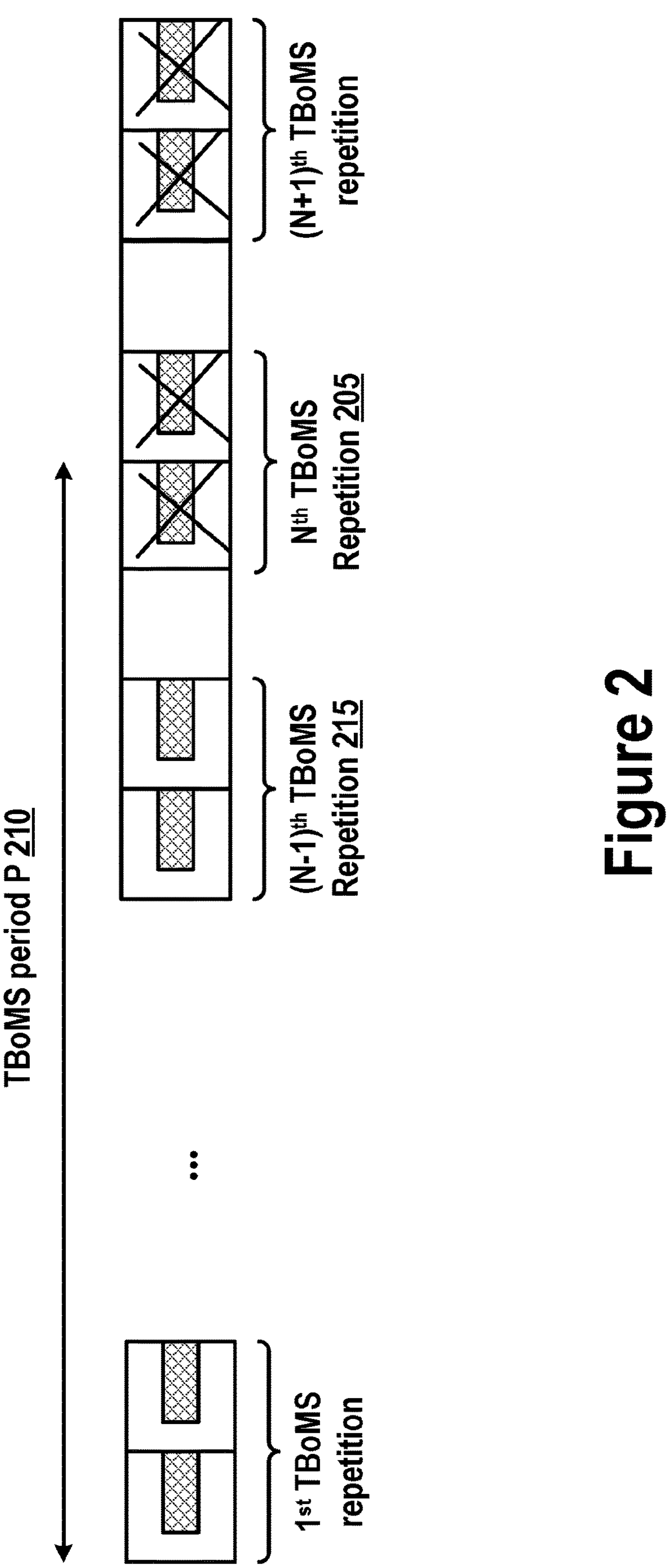
FIG. 2 illustrates an example of termination of configured grant-based TB over multiple slot (TBoMS) repetitions, in accordance with various embodiments.

FIG. 2 illustrates one example of termination of configured grant based TBoMS repetitions. In this example, part of Nth (N<K) TBoMS repetition 205 is within the period P 210. Based on this option. UE shall terminate the TBoMS repetitions after the (N−1)th TBoMS repetition 215. More specifically. TBoMS repetitions from Nth repetition to Kth repetition are not transmitted. Note that TBoMS transmission is based on available slot. The slot between TBoMS repetitions indicates that the slot is not available and not used for TBoMS repetition.

In another embodiment, for configured grant based TBoMS transmission, the repetitions shall be terminated after transmitting K repetitions, or at the last transmission occasion among the K repetitions with at least one slot within the period P, or from the starting symbol of the repetition that overlaps with a PUSCH with the same HARQ process scheduled by DCI format 0_0, 0_1 or 0_2, whichever is reached first. Here, for the last condition, a repetition of a TBoMS may be interpreted to overlap with the PUSCH with the same HARQ process scheduled by DCI format 0_0, 0_1, or 0_2 if the dynamically granted is scheduled in one or more symbols that occur within the overall duration of the repetition of the TBoMS that may span multiple slots, including slots that may not be available for mapping of the TBoMS. In other words, the dynamically granted PUSCH may be scheduled in a slot that may be unavailable for TBoMS mapping.

Further, in an example of the embodiment, for the last condition, if dynamic grant (DG) PUSCH is a TBoMS-based PUSCH, then the DG PUSCH may be interpreted to overlap with a repetition of a TBoMS-based or "single-slot" (i.e., "non-TBoMS-based") CG PUSCH if the time duration over which the TBoMS-based DG PUSCH is mapped and the time duration over which a repetition of the CG PUSCH is mapped overlap.

Further, in an example, for the last condition above, the starting symbol of a TBoMS repetition may correspond to the first symbol of the TBoMS-based PUSCH in the first available slot to which the repetition of the TBoMS is mapped.

In another example, for the last condition above, the starting symbol of a TBoMS repetition may correspond to the first symbol of the TBoMS-based PUSCH in the available slot in which the dynamically granted PUSCH is scheduled or the earliest slot available for TBoMS mapping after the slot in which the dynamically granted PUSCH is scheduled if the dynamically granted PUSCH is scheduled in a slot that is not available for TBoMS-based PUSCH transmission.

For this option, termination occurs after the last TBoMS repetition among K repetitions within the period P. Note that TBoMS repetition is transmitted based on the available slots. In this case, if only part of a TBoMS repetition is within the period P, then this TBoMS repetition is transmitted and next TBoMS repetition is not transmitted. Further, in an example of the embodiment, the repetitions may be terminated after transmission of the last TBoMS occasion among the K repetitions with at least one slot within the period P only either if the whole TBoMS occasion may be included within the period P or if the slots for the TBoMS occasion that occur beyond the period P do not overlap in time with TBoMS occasions corresponding to the following period of the TBoMS-based CG PUSCH.

Figure 3:
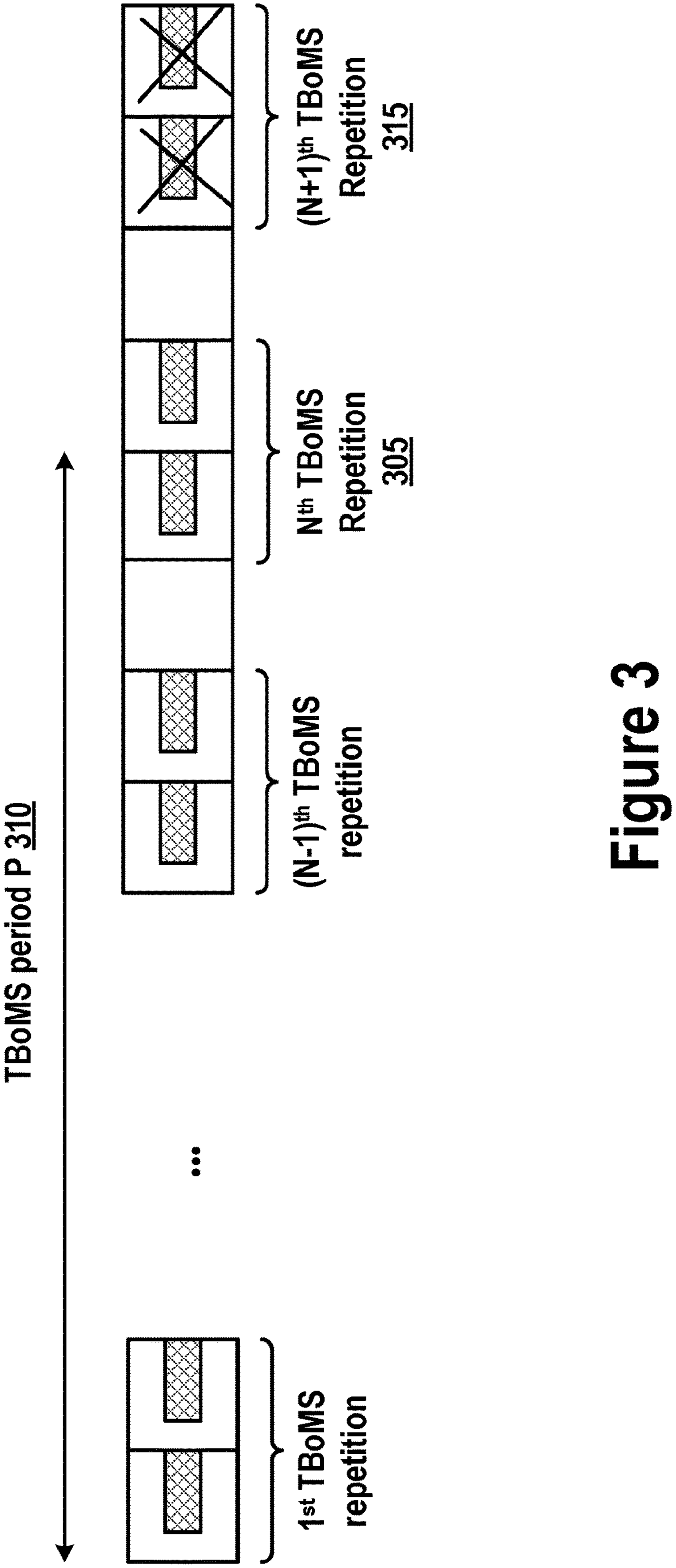
FIG. 3 illustrates an alternative example of termination of configured grant-based TBoMS repetitions, in accordance with various embodiments.

FIG. 3 illustrates one example of termination of configured grant based TBoMS repetitions. In this example, part of Nth (N<K) TBoMS repetition 305 is within the period P 310. Based on this option. UE shall terminate the TBoMS repetitions after the Nth TBoMS repetition. More specifically. TBoMS repetitions from (N+1)th repetition 315 to Kth repetition are not transmitted.

Per Rel-15/16 NR specifications, a CG PUSCH transmission may be dropped if it overlaps with a Dynamically Granted (DG) PUSCH that is scheduled to overlap in one or more symbols of the CG PUSCH. In such a case. MAC layer in the UE is expected to not deliver a MAC PDU to PHY layer in the UE for CG PUSCH and only the MAC PDU corresponding to the DG PUSCH is delivered.

In an embodiment, for TBoMS-based CG PUSCH, a DG PUSCH may be interpreted to overlap with a TBoMS-based CG PUSCH if the DG PUSCH is scheduled in symbols that occur within the duration spanning multiple slots over which the TBoMS-based CG PUSCH occasion is mapped.

Further, in an example of the embodiment, if DG PUSCH is a TBoMS-based PUSCH, then the DG PUSCH may be interpreted to overlap with a TBoMS-based or "single-slot" (i.e., "non-TBoMS-based") CG PUSCH if the time duration over which the TBoMS-based DG PUSCH is mapped and the time duration over which the CG PUSCH is mapped overlap.

A-CSI Multiplexing Mechanism on TBoMS

As mentioned above, in Rel-15, if PUSCH slot aggregation is enabled, aperiodic CSI (A-CSI) may be multiplexed only in the PUSCH in the first slot. In addition. A-CSI report triggered by DCI on PUSCH repetition Type B without UL-SCH may be carried on the first nominal repetition with the other nominal repetitions discarded. CSI report triggered by DCI on PUSCH repetition Type B with UL-SCH is carried on the first actual repetition.

Note that when TBoMS is scheduled and when A-CSI report is triggered and multiplexed on the TBoMS, certain mechanism may need to be defined on the multiplexing rule for A-CSI on TBoMS, which may also depend on whether UL-SCH is carried on the TBoMS.

Embodiments of A-CSI Multiplexing Mechanism on TBoMS are Provided as Follows:

In one embodiment, when A-CSI report is triggered and multiplexed on TBoMS with UL-SCH. A-CSI report is multiplexed only on the first slot of the TBoMS transmission. Further, the amount of resources allocated for A-CSI on the first slot of the TBoMS transmission is determined in accordance with the number of REs allocated for each slot.

Figure 4:
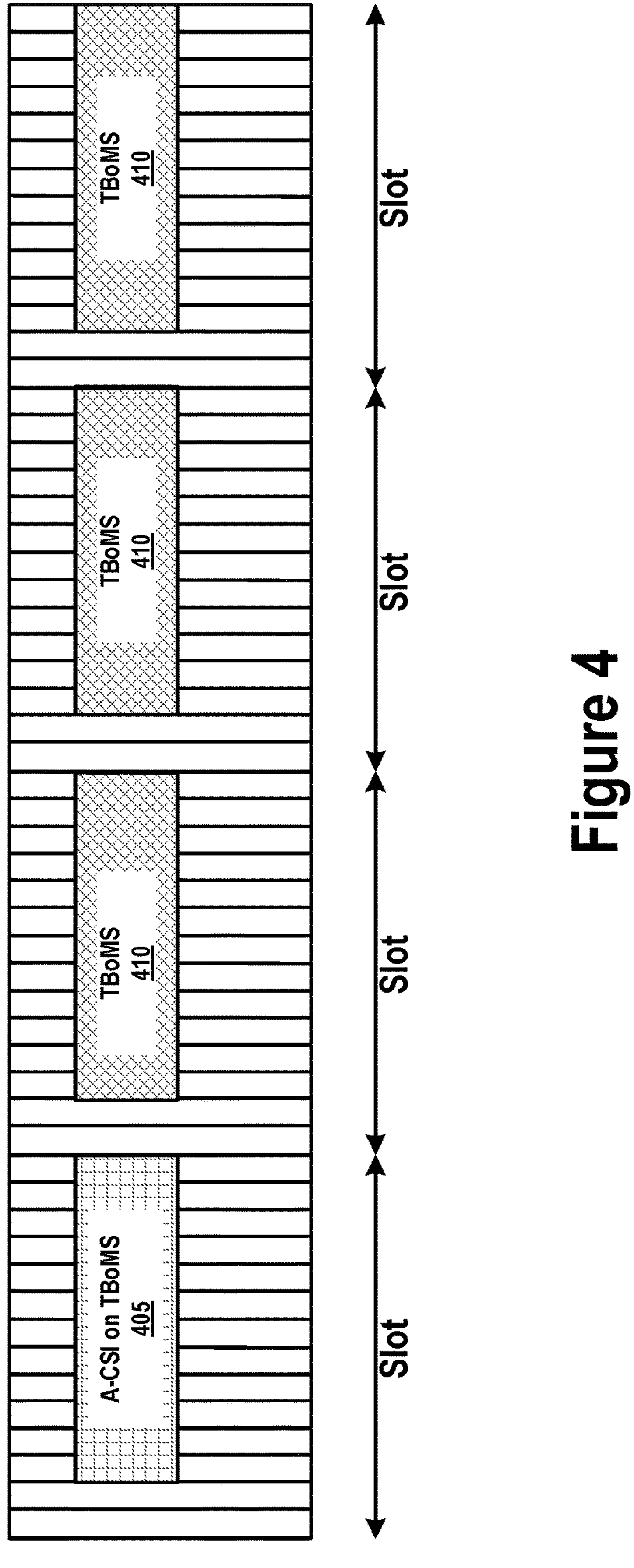
FIG. 4 illustrates an example of A-CSI multiplexing on a single TBoMS transmission, in accordance with various embodiments.

FIG. 4 illustrates one example of A-CSI multiplexing on a single TBoMS transmission. In the example, A-CSI is multiplexed in the first slot of the TBoMS transmission at 405. The remaining TBoMS transmissions at 410 may not include the A-CSI. The number of REs allocated for A-CSI report is determined based on the number of REs allocated for TBoMS transmission in a slot.

In another embodiment, when A-CSI report is triggered and multiplexed on TBoMS with UL-SCH, the amount of resources allocated for A-CSI on TBoMS transmission is determined in accordance with the number of REs allocated for all the allocated slots for TBoMS transmission. When the number of REs is larger than allocated resources for TBoMS in a slot, the A-CSI report may be multiplexed in the next available slots for TBoMS transmission.

As a further extension, to avoid the transmission of A-CSI to the second or subsequent available slots on TBoMS transmission and reduce the latency, an upper limit on the number of REs used to map the modulated symbols corresponding to the A-CSI can be defined to allow the A-CSI only on the first or more slot(s) of TBoMS. The upper limit can be configured by higher layers via remaining minimum system information (RMSI) or dedicated radio resource control (RRC) signalling or determined in accordance with the amount of REs allocated for TBoMS transmission in a slot.

In one example, the upper limit is defined as the amount of REs allocated for TBoMS transmission in a slot. In case when the number of calculated REs for A-CSI is larger than the upper limit. A-CSI only is transmitted on TBoMS in the first slot. In another example, the upper limit may be configured by higher layers. In case when the number of calculated REs for A-CSI is larger than the upper limit, A-CSI is transmitted on TBoMS in the first one or more slot(s) that can accommodate the configured upper limit on the number of REs that may be used to map the A-CSI. Note that HARQ-ACK feedback may be multiplexed with A-CSI when PUCCH overlaps TBoMS in the first slot.

Figure 5:
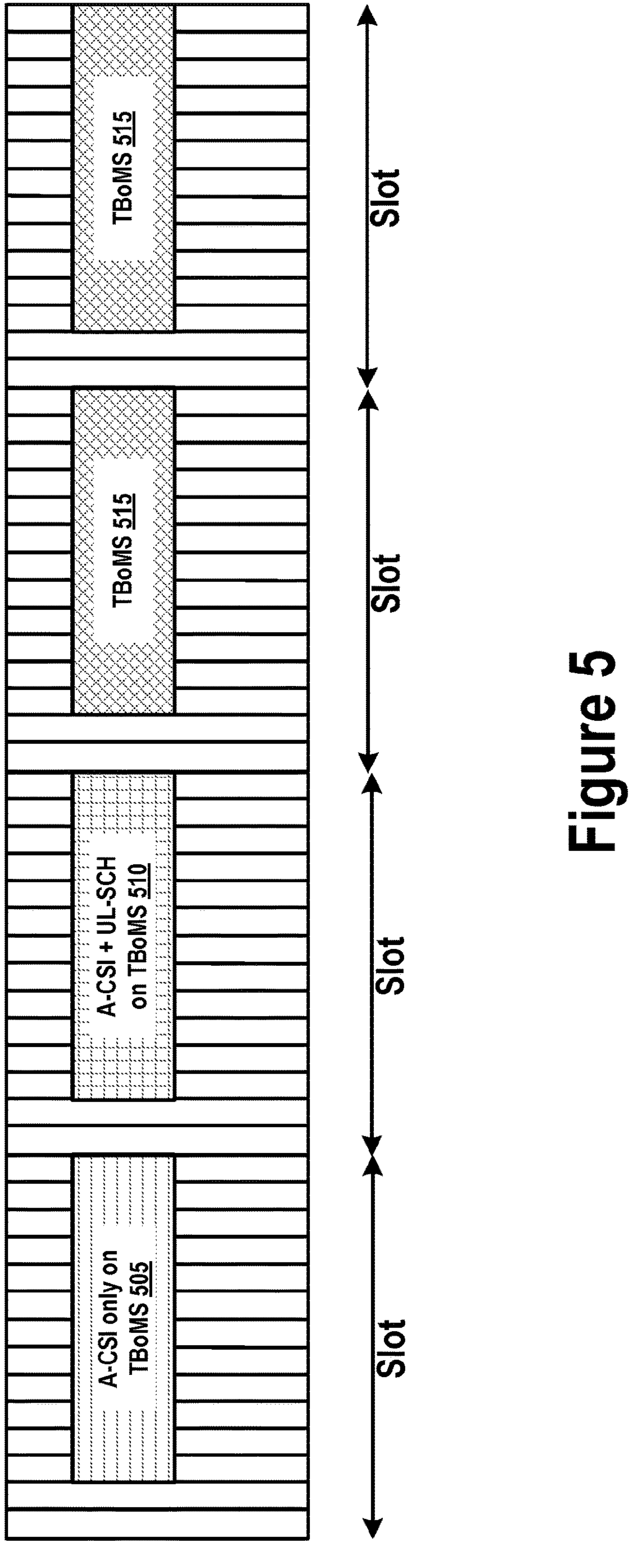
FIG. 5 illustrates an alternative example of A-CSI multiplexing on a single TBoMS transmission, in accordance with various embodiments.

FIG. 5 illustrates one example of A-CSI multiplexing on a single TBoMS transmission. In the example, A-CSI is multiplexed in the first and second slot of the TBoMS transmission at 505 and 510. Further, in the first slot of TBoMS 505, A-CSI only is transmitted while in the second slot of TBoMS 510, A-CSI and UL-SCH are multiplexed on the TBoMS. The remaining slots of TBoMS 515 may not include A-CSI or UL-SCH. The number of REs allocated for A-CSI report is determined based on the number of REs allocated for all the allocated slots for TBoMS transmission.

In another embodiment, when A-CSI report is triggered and multiplexed on TBoMS with UL-SCH, the amount of resources allocated for A-CSI on TBoMS transmission is determined in accordance with the number of REs allocated for all the allocated slots for TBoMS transmission. Further, the number of REs for A-CSI is equally spread into allocated slots for TBoMS transmission. In this case, A-CSI and UL-SCH are multiplexed in each slot of allocated slots for TBoMS transmission.

In another option, the number of REs for A-CSI is equally spread into allocated slots for TBoMS transmission, while the number of REs for A-CSI in each slot is determined in accordance with the number of REs allocated for TBoMS in each slot. In this case, A-CSI and UL-SCH are multiplexed in each slot of allocated slots for TBoMS transmission.

Further, after encoding, A-CSI report is rate-matched in accordance with the determined resources in all the allocated slots for TBoMS transmission and continuously mapped to the resource in each slot. Yet in another option, A-CSI report is rate-matched in accordance with the determined resource in one slot and repeatedly mapped to the resource in each slot.

Figure 6:
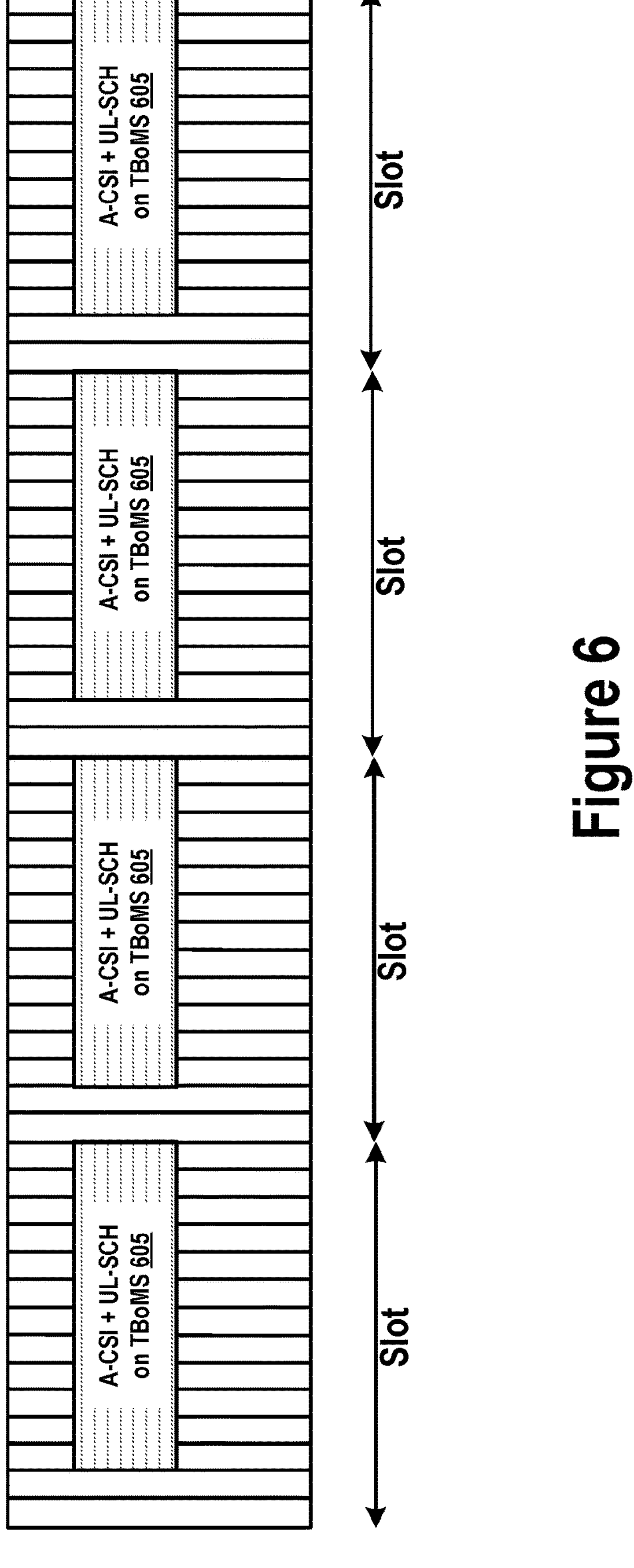
FIG. 6 illustrates an alternative example of A-CSI multiplexing on a single TBoMS transmission, in accordance with various embodiments.

FIG. 6 illustrates one example of A-CSI multiplexing on a single TBoMS transmission. In the example, A-CSI is multiplexed with UL-SCH in all the available slots allocated for the TBoMS transmission 605. The number of REs for A-CSI in each slot is determined in accordance with the number of REs allocated for TBoMS in each slot.

In another embodiment, when A-CSI report is multiplexed on TBoMS without UL-SCH, i.e., when UL-SCH indicator is indicated as "0", A-CSI report is only multiplexed on the TBoMS in the first slot. Further, the remaining slots allocated for TBoMS transmission are dropped.

In another option, in case when UL-SCH is not present number of slots used for A-CSI report within configured/indicated number of slots for TBoMS transmission can be configured by higher layers via RMSI or RRC signaling or dynamically indicated in the DCI or a combination thereof.

In another option, when A-CSI report is multiplexed on TBoMS without UL-SCH, i.e., when UL-SCH indicator is indicated as "0", A-CSI report is multiplexed on the all the available slots allocated for TBoMS.

In another embodiment, when repetition is configured/indicated for the TBoMS transmission, when UL-SCH is present, A-CSI is only multiplexed on the first repetition of TBoMS transmission. The aforementioned options can be applied for the A-CSI multiplexing on the first repetition of TBoMS transmission.

Further, when UL-SCH is not present, A-CSI is only transmitted on the first repetition of TBoMS transmission. The aforementioned options can be applied for the A-CSI multiplexing on the first repetition of TBoMS transmission, e.g., in the first slot only of the first TBoMS repetition, or all the available slots of the first TBoMS repetition.

In another embodiment, UE is not expected to be triggered with TBoMS transmission together with A-CSI report. In particular, in case when a separate time domain resource allocation (TDRA) table is configured for TBoMS transmission, UE is not expected to be triggered with A-CSI report using the TDRA table that is allocated for TBoMS transmission.

If a shared TDRA table is configured for TBoMS transmission and single-slot PUSCH with and without repetition, UE is not expected to be triggered with A-CSI report using the entries in the shared TDRA table that are allocated for TBoMS transmission.

In another embodiment, when semi-persistent channel state information (SP-CSI) is activated, UE is not expected to be triggered with TBoMS transmission together with SP-CSI report. In particular, in case when a separate time domain resource allocation (TDRA) table is configured for TBoMS transmission, UE is not expected to be triggered with SP-CSI report using the TDRA table that is allocated for TBoMS transmission.

If a shared TDRA table is configured for TBoMS transmission and single-slot PUSCH with and without repetition, UE is not expected to be triggered with SP-CSI report using the entries in the shared TDRA table that are allocated for TBoMS transmission.

In another embodiment, when SP-CSI is activated with TBoMS transmission without repetition, SP-CSI is only transmitted on the TBoMS in the first slot. Further, the remaining slots allocated for TBoMS transmission are dropped. Similarly, when SP-CSI is activated with TBoMS transmission with repetition, SP-CSI is only transmitted on the TBoMS in the first slot in the first repetition. Further, the remaining slots allocated for TBoMS transmission in the first repetition and all slots for the remaining repetitions are dropped.

In another option, when SP-CSI is activated with TBoMS transmission without repetition, SP-CSI is transmitted on the TBoMS in all slots for a single TBoMS transmission. Similarly, when SP-CSI is activated with TBoMS transmission with repetition, SP-CSI is transmitted on the TBoMS in all the slots in the first repetition. Alternatively, SP-CSI is transmitted on the TBoMS in all the slots in all repetitions.

Note that one or more of the aforementioned options can be applied for the SP-CSI transmission without associated activation DCI.

In another embodiment, for A-CSI multiplexing on TBoMS with UL-SCH, 3GPP technical specification (TS) 38.214, Section 6.1.2.1, may be updated as follows (updates indicated by underline):

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows

- if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the first transmission occasion.

In another embodiment, for A-CSI multiplexing on TBoMS with UL-SCH, for A-CSI multiplexing on TBoMS with UL-SCH, A-CSI can be multiplexed on the first slot of the TBoMS transmission which is determined for the PUSCH transmission. This can be applied for the TBoMS transmission with or without repetition.

An example updated specification in Section 6.1.2.1 in third generation partnership project (3GPP) technical specification (TS) 38.214 may be as follows (updates indicated by underline):

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the first slot of the N·K slots determined for the PUSCH transmission.

In another embodiment, for A-CSI multiplexing on TBoMS with UL-SCH, for A-CSI multiplexing on TBoMS with UL-SCH, A-CSI can be multiplexed on the second slot of the TBoMS transmission which is determined for the PUSCH transmission. This can be applied for the TBoMS transmission with or without repetition.

An example updated specification in Section 6.1.2.1 in TS38.214 may be as follows (updates indicated by underline):

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the second slot of the N·K slots determined for the PUSCH transmission.

In another embodiment, for A-CSI multiplexing on TBoMS with UL-SCH, A-CSI can be multiplexed on the last slot determined for the TBoMS transmission if repetition is not configured/indicated for TBoMS. In addition, A-CSI can be multiplexed on the last slot of the first TBoMS repetitions which is determined for the TBoMS transmission if repetition is configured/indicated for TBoMS.

An example updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the $N^{th}$ slot of the N·K slots determined for the PUSCH transmission.

For A-CSI multiplexing on TBoMS without UL-SCH, 3GPP TS 38.214, Section 6.1.2.1, may be updated as follows (updates indicated by underline):

For PUSCH repetition Type A, when a DCI format 0_1 and DCI format 0_2 indicates codepoint "10" or "11" for the SRS resource set indicator and schedules aperiodic CSI report(s) on PUSCH with no transport block by a 'CSI request' field on a DCI, the number of repetitions is assumed to be 2 regardless of the value of numberOfRepetitions or pusch-AggregationFactor (if numberOfRepetitions is not present in the time domain resource allocation table), and transmission of CSI report(s) is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately on the first transmission occasion and the second transmission occasion otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the first transmission occasion.

For SP-CSI multiplexing on TBoMS without UL-SCH, 3GPP TS 38.214, Section 6.1.2.1, may be updated as follows (updates indicated by underline):

For PUSCH repetition Type A, when a DCI format 0_1 and DCI format 0_2 indicates codepoint "10" or "11" for the SRS resource set indicator and activates semi-persistent CSI report(s) on PUSCH with no transport block by a 'CSI request' field on a DCI, the number of repetitions is always assumed to be 2 regardless of the value of numberOfRepetitions or pusch-AggregationFactor (if numberOfRepetitions is not present in the time domain resource allocation table), and transmission of CSI report(s) is determined as follows if higher layer parameter SP-CSI-MultiplexingMode in CSI-SemiPersistenetOnPUSCH-TriggerStateList is enabled and UCI other than CSI report(s) are not multiplexed on PUSCH, the CSI report(s) is transmitted separately on the first transmission occasion and the second transmission occasion otherwise, the CSI report(s) is transmitted only on the first transmission occasion.

For PUSCH transmissions of TB processing over multiple slots, when a DCI format 0_1 and DCI format 0_2 activates semi-persistent CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the first transmission occasion.

In another embodiment, for A-CSI multiplexing on TBoMS with UL-SCH, for PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the second, second to last or last transmission occasion.

If the number of slots for TBoMS is 2, the CSI report(s) is transmitted only on the second transmission occasion.

In one option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with transport block by a 'CSI request' field on a DCI, the CSI report(s) is transmitted only on the last transmission occasion.

In another option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and schedules aperiodic CSI report(s) on PUSCH with transport block by a 'CSI request' field on a DCI, the CSI report(s) multiplexing is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately only on the first transmission occasion associated with the first SRS resource set and the first transmission occasion associated with the second SRS resource set.

otherwise, the CSI report(s) is transmitted only on the first transmission occasion.

For PUSCH transmissions of TB processing over multiple slots, when a DCI format 0_ 1 and DCI format 0_2 schedules aperiodic CSI report(s) on PUSCH with transport block by a 'CSI request' field on a DCI, the CSI report(s) is transmitted only on the second transmission occasion.

For A-CSI multiplexing on TBoMS without UL-SCH, for PUSCH transmissions of TB processing over multiple slots, when a DCI format 0_1 and DCI format 0_2 schedules aperiodic CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the second, second to last or last transmission occasion.

In one option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and schedules aperiodic CSI report(s) on PUSCH with no transport block by a 'CSI request' field on a DCI, the number of repetitions is assumed to be 2 regardless of the value of numberOfRepetitions or pusch-AggregationFactor (if numberOfRepetitions is not present in the time domain resource allocation table), and transmission of CSI report(s) is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately on the first transmission occasion and the second transmission occasion otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the last transmission occasion.

In another option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and schedules aperiodic CSI report(s) on PUSCH with no transport block by a 'CSI request' field on a DCI, the number of repetitions is assumed to be 2 regardless of the value of numberOfRepetitions or pusch-AggregationFactor (if numberOfRepetitions is not present in the time domain resource allocation table), and transmission of CSI report(s) is determined as follows if higher layer parameter AP-CSI-MultiplexingMode in CSI-AperiodicTriggerStateList is enabled and UCI other than CSI report(s) are not multiplexed on PUSCH, the CSI report(s) is transmitted separately on the first transmission occasion and the second transmission occasion otherwise, the CSI report(s) is transmitted only on the first transmission occasion.

For PUSCH transmissions of TB processing over multiple slots, when a DCI format 0_1 and DCI format 0_2 schedules aperiodic CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the second transmission occasion.

For SP-CSI multiplexing on TBoMS without UL-SCH, for PUSCH transmissions of TB processing over multiple slots, when a DCI format 0_1 and DCI format 0_2 activates semi-persistent CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the second, last or second to last transmission occasion.

In one option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and activates semi-persistent CSI report(s) on PUSCH with no transport block by a 'CSI request' field on a DCI, the number of repetitions is always assumed to be 2 regardless of the value of numberOfRepetitions or pusch-AggregationFactor (if numberOfRepetitions is not present in the time domain resource allocation table), and transmission of CSI report(s) is determined as follows

- if higher layer parameter SP-CSI-MultiplexingMode in CSI-SemiPersistenetOnPUSCH-TriggerStateList is enabled and UCI other than CSI report(s) are not multiplexed on PUSCH, the CSI report(s) is transmitted separately on the first transmission occasion and the second transmission occasion
- otherwise, the CSI report(s) is transmitted only on the first transmission occasion.

For PUSCH transmissions of TB processing over multiple slots, when a DCI format 0_1 and DCI format 0_2 activates semi-persistent CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the last transmission occasion.

In another option, the updated specification in Section 6.1.2.1 in TS38.214 is highlighted with underline as follows:

For PUSCH repetition Type A, when a DCI format 0_1 and DCI format 0_2 indicates codepoint "10" or "11" for the SRS resource set indicator and activates semi-persistent CSI report(s) on PUSCH with no transport block by a 'CSI request' field on a DCI, the number of repetitions is always assumed to be 2 regardless of the value of numberOfRepetitions or pusch-AggregationFactor (if numberOfRepetitions is not present in the time domain resource allocation table), and transmission of CSI report(s) is determined as follows

- if higher layer parameter SP-CSI-MultiplexingMode in CSI-SemiPersistenetOnPUSCH-TriggerStateList is enabled and UCI other than CSI report(s) are not multiplexed on PUSCH, the CSI report(s) is transmitted separately on the first transmission occasion and the second transmission occasion
- otherwise, the CSI report(s) is transmitted only on the first transmission occasion.

For PUSCH transmissions of TB processing over multiple slots, when a DCI format 0_1 and DCI format 0_2 activates semi-persistent CSI report(s) on PUSCH with no transport block by a 'CSI request' field on a DCI, the number of slots used for TBS determination is assumed to be 1 regardless of the value of numberOfSlotsTBoMS, and the number of repetitions is assumed to be 1 regardless of the value of numberOfRepetitions. The CSI report(s) is transmitted only on the second transmission occasion.

In another embodiment, in case of uplink skipping. UE is not expected that PUSCH skipping (including both enhancedSkipUplinkTxDynamic-r16 and enhancedSkipUplinkTxConfigured-r16) and TBoMS are enabled together when Rel-16 LCH based prioritization is not configured and there is a single PHY priority for UL transmissions.

In another embodiment, for TBoMS based PUSCH, minimum UE processing timelines between UL grant and start of the PUSCH, or for multiplexing of UCI to PUSCH, or for cancelation of the PUSCH, the starting symbol of the PUSCH may be defined based on the first symbol in the first available slot for the TBoMS based PUSCH. In another example, for TBoMS based PUSCH, minimum UE processing timelines between UL grant and start of the PUSCH, or for multiplexing of UCI to PUSCH, or for cancelation of the PUSCH, the starting symbol of the PUSCH may be defined based on the first symbol in the first nominal slot for the TBoMS based PUSCH, where the first nominal slot for TBoMS card PUSCH is determined according to the higher layer configuration (for CG PUSCH) and/or as indicated in the UL grant (for DG PUSCH and type 2 CG PUSCH). In a further example, for Dynamically Granted (DG) PUSCH, the UE may expect the first slot with TBoMS based PUSCH is mapped to an available slot.

In another embodiment, a dynamic physical uplink control channel (PUCCH) repetition factor indication is applied for the case when a PUCCH resource is determined or associated with a corresponding downlink control information (DCI). In particular, when the repetition factor is configured per PUCCH resource, and when the PUCCH resource is indicated by a PUCCH resource indicator (PRI) and/or a starting control channel element (CCE) index of the corresponding physical downlink control channel (PDCCH) transmission.

This embodiment may be desirable for, or be used for, the case when a PUCCH resource is determined if a PUCCH carrying dynamic HARQ-ACK feedback overlaps with a PUCCH resource carrying periodic channel state information (P-CSI) and/or semi-persistent CSI (SP-CSI) and/or scheduling request (SR) and/or semi-static HARQ-ACK feedback. Here dynamic HARQ-ACK feedback may include the following, but may not be limited to:

- HARQ-ACK feedback in response to PDSCH scheduled by a DCI
- HARQ-ACK for the first semi-persistent scheduling (SPS) PDSCH associated with the activation DCI.
- HARQ-ACK corresponding to the SPS Release DCI Semi-static HARQ-ACK feedback may include, but not limited to: HARQ-ACK feedback for the SPS PDSCH which is not associated with a DCI.

Systems and Implementations

FIGS. 7-10 illustrate various systems, devices, and components that may implement aspects of disclosed embodiments.

Figure 7:
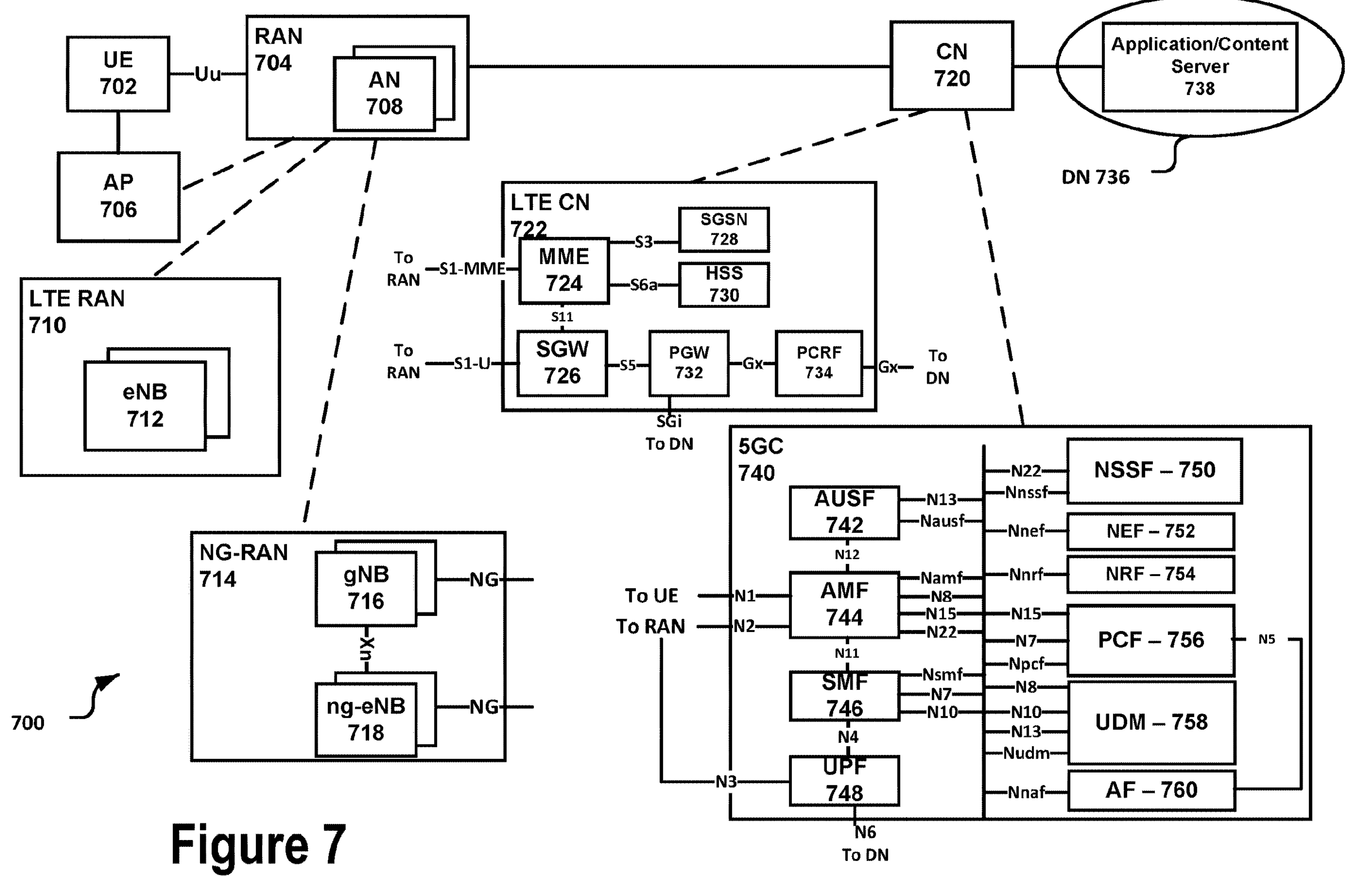
FIG. 7 illustrates a network in accordance with various embodiments.

FIG. 7 illustrates a network 700 in accordance with various embodiments. The network 700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 700 may include a UE 702, which may include any mobile or non-mobile computing device designed to communicate with a RAN 704 via an over-the-air connection. The UE 702 may be communicatively coupled with the RAN 704 by a Uu interface. The UE 702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 702 may additionally communicate with an AP 706 via an over-the-air connection. The AP 706 may manage a WLAN connection, which may serve to offload some/all network traffic from the RAN 704. The connection between the UE 702 and the AP 706 may be consistent with any IEEE 802.11 protocol, wherein the AP 706 could be a wireless fidelity (Wi-Fi R) router. In some embodiments, the UE 702, RAN 704, and AP 706 may utilize cellular-WLAN aggregation (for example, LWA/LWIP). Cellular-WLAN aggregation may involve the UE 702 being configured by the RAN 704 to utilize both cellular radio resources and WLAN resources.

The RAN 704 may include one or more access nodes, for example, AN 708. AN 708 may terminate air-interface protocols for the UE 702 by providing access stratum protocols including RRC, PDCP, RLC, MAC, and L1 protocols. In this manner, the AN 708 may enable data/voice connectivity between CN 720 and the UE 702. In some embodiments, the AN 708 may be implemented in a discrete device or as one or more software entities running on server computers as part of, for example, a virtual network, which may be referred to as a CRAN or virtual baseband unit pool. The AN 708 be referred to as a BS, gNB, RAN node, eNB, ng-eNB, NodeB, RSU, TRxP, TRP, etc. The AN 708 may be a macrocell base station or a low power base station for providing femtocells, picocells or other like cells having smaller coverage areas, smaller user capacity, or higher bandwidth compared to macrocells.

In embodiments in which the RAN 704 includes a plurality of ANs, they may be coupled with one another via an X2 interface (if the RAN 704 is an LTE RAN) or an Xn interface (if the RAN 704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 704 may each manage one or more cells, cell groups, component carriers, etc. to provide the UE 702 with an air interface for network access. The UE 702 may be simultaneously connected with a plurality of cells provided by the same or different ANs of the RAN 704. For example, the UE 702 and RAN 704 may use carrier aggregation to allow the UE 702 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 704 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 702 or AN 708 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU": an eNB may be referred to as an "eNB-type RSU": a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 704 may be an LTE RAN 710 with eNBs, for example, eNB 712. The LTE RAN 710 may provide an LTE air interface with the following characteristics: SCS of 15 kHz: CP-OFDM waveform for DL and SC-FDMA waveform for UL; turbo codes for data and TBCC for control: etc. The LTE air interface may rely on CSI-RS for CSI acquisition and beam management: PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHZ bands.

In some embodiments, the RAN 704 may be an NG-RAN 714 with gNBs, for example, gNB 716, or ng-eNBs, for example, ng-eNB 718. The gNB 716 may connect with 5G-enabled UEs using a 5G NR interface. The gNB 716 may connect with a 5G core through an NG interface, which may include an N2 interface or an N3 interface. The ng-eNB 718 may also connect with the 5G core through an NG interface, but may connect with a UE via an LTE air interface. The gNB 716 and the ng-eNB 718 may connect with each other over an Xn interface.

In some embodiments, the NG interface may be split into two parts, an NG user plane (NG-U) interface, which carries traffic data between the nodes of the NG-RAN 714 and a UPF 748 (e.g., N3 interface), and an NG control plane (NG-C) interface, which is a signaling interface between the nodes of the NG-RAN 714 and an AMF 744 (e.g., N2 interface).

The NG-RAN 714 may provide a 5G-NR air interface with the following characteristics: variable SCS: CP-OFDM for DL, CP-OFDM and DFT-s-OFDM for UL: polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation: PTRS for phase tracking for PDSCH; and tracking reference signal for time tracking. The 5G-NR air interface may operating on FR1 bands that include sub-6 GHZ bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 702 can be configured with multiple BWPs where each BWP configuration has a different SCS. When a BWP change is indicated to the UE 702, the SCS of the transmission is changed as well. Another use case example of BWP is related to power saving. In particular, multiple BWPs can be configured for the UE 702 with different amount of frequency resources (for example, PRBs) to support data transmission under different traffic loading scenarios. A BWP containing a smaller number of PRBs can be used for data transmission with small traffic load while allowing power saving at the UE 702 and in some cases at the gNB 716. A BWP containing a larger number of PRBs can be used for scenarios with higher traffic load.

The RAN 704 is communicatively coupled to CN 720 that includes network elements to provide various functions to support data and telecommunications services to customers/subscribers (for example, users of UE 702). The components of the CN 720 may be implemented in one physical node or separate physical nodes. In some embodiments, NFV may be utilized to virtualize any or all of the functions provided by the network elements of the CN 720 onto physical compute/storage resources in servers, switches, etc. A logical instantiation of the CN 720 may be referred to as a network slice, and a logical instantiation of a portion of the CN 720 may be referred to as a network sub-slice.

In some embodiments, the CN 720 may be an LTE CN 722, which may also be referred to as an EPC. The LTE CN 722 may include MME 724, SGW 726, SGSN 728, HSS 730, PGW 732, and PCRF 734 coupled with one another over interfaces (or "reference points") as shown. Functions of the elements of the LTE CN 722 may be briefly introduced as follows.

The MME 724 may implement mobility management functions to track a current location of the UE 702 to facilitate paging, bearer activation/deactivation, handovers, gateway selection, authentication, etc.

The SGW 726 may terminate an S1 interface toward the RAN and route data packets between the RAN and the LTE CN 722. The SGW 726 may be a local mobility anchor point for inter-RAN node handovers and also may provide an anchor for inter-3GPP mobility. Other responsibilities may include lawful intercept, charging, and some policy enforcement.

The SGSN 728 may track a location of the UE 702 and perform security functions and access control. In addition, the SGSN 728 may perform inter-EPC node signaling for mobility between different RAT networks: PDN and S-GW selection as specified by MME 724; MME selection for handovers: etc. The S3 reference point between the MME 724 and the SGSN 728 may enable user and bearer information exchange for inter-3GPP access network mobility in idle/active states.

The HSS 730 may include a database for network users, including subscription-related information to support the network entities' handling of communication sessions. The HSS 730 can provide support for routing/roaming, authentication, authorization, naming/addressing resolution, location dependencies, etc. An S6a reference point between the HSS 730 and the MME 724 may enable transfer of subscription and authentication data for authenticating/authorizing user access to the LTE CN 720.

The PGW 732 may terminate an SGi interface toward a data network (DN) 736 that may include an application/content server 738. The PGW 732 may route data packets between the LTE CN 722 and the data network 736. The PGW 732 may be coupled with the SGW 726 by an S5 reference point to facilitate user plane tunneling and tunnel management. The PGW 732 may further include a node for policy enforcement and charging data collection (for example, PCEF). Additionally, the SGi reference point between the PGW 732 and the data network 736 may be an operator external public, a private PDN, or an intra-operator packet data network, for example, for provision of IMS services. The PGW 732 may be coupled with a PCRF 734 via a Gx reference point.

The PCRF 734 is the policy and charging control element of the LTE CN 722. The PCRF 734 may be communicatively coupled to the app/content server 738 to determine appropriate QoS and charging parameters for service flows. The PCRF 732 may provision associated rules into a PCEF (via Gx reference point) with appropriate TFT and QCI.

In some embodiments, the CN 720 may be a 5GC 740. The 5GC 740 may include an AUSF 742, AMF 744, SMF 746, UPF 748, NSSF 750, NEF 752, NRF 754, PCF 756, UDM 758, and AF 760 coupled with one another over interfaces (or "reference points") as shown. Functions of the elements of the 5GC 740 may be briefly introduced as follows.

The AUSF 742 may store data for authentication of UE 702 and handle authentication-related functionality. The AUSF 742 may facilitate a common authentication framework for various access types. In addition to communicating with other elements of the 5GC 740 over reference points as shown, the AUSF 742 may exhibit an Nausf service-based interface.

The AMF 744 may allow other functions of the 5GC 740) to communicate with the UE 702 and the RAN 704 and to subscribe to notifications about mobility events with respect to the UE 702. The AMF 744 may be responsible for registration management (for example, for registering UE 702), connection management, reachability management, mobility management, lawful interception of AMF-related events, and access authentication and authorization. The AMF 744 may provide transport for SM messages between the UE 702 and the SMF 746, and act as a transparent proxy for routing SM messages. AMF 744 may also provide transport for SMS messages between UE 702 and an SMSF. AMF 744 may interact with the AUSF 742 and the UE 702 to perform various security anchor and context management functions. Furthermore. AMF 744 may be a termination point of a RAN CP interface, which may include or be an N2 reference point between the RAN 704 and the AMF 744; and the AMF 744 may be a termination point of NAS (N1) signaling, and perform NAS ciphering and integrity protection. AMF 744 may also support NAS signaling with the UE 702 over an N3 IWF interface.

The SMF 746 may be responsible for SM (for example, session establishment, tunnel management between UPF 748 and AN 708): UE IP address allocation and management (including optional authorization): selection and control of UP function: configuring traffic steering at UPF 748 to route traffic to proper destination: termination of interfaces toward policy control functions: controlling part of policy enforcement, charging, and QoS: lawful intercept (for SM events and interface to LI system): termination of SM parts of NAS messages: downlink data notification: initiating AN specific SM information, sent via AMF 744 over N2 to AN 708; and determining SSC mode of a session. SM may refer to management of a PDU session, and a PDU session or "session" may refer to a PDU connectivity service that provides or enables the exchange of PDUs between the UE 702 and the data network 736.

The UPF 748 may act as an anchor point for intra-RAT and inter-RAT mobility, an external PDU session point of interconnect to data network 736, and a branching point to support multi-homed PDU session. The UPF 748 may also perform packet routing and forwarding, perform packet inspection, enforce the user plane part of policy rules, lawfully intercept packets (UP collection), perform traffic usage reporting, perform QoS handling for a user plane (e.g., packet filtering, gating. UL/DL rate enforcement), perform uplink traffic verification (e.g., SDF-to-QoS flow mapping), transport level packet marking in the uplink and downlink, and perform downlink packet buffering and downlink data notification triggering. UPF 748 may include an uplink classifier to support routing traffic flows to a data network.

The NSSF 750 may select a set of network slice instances serving the UE 702. The NSSF 750 may also determine allowed NSSAI and the mapping to the subscribed S-NSSAIs, if needed. The NSSF 750 may also determine the AMF set to be used to serve the UE 702, or a list of candidate AMFs based on a suitable configuration and possibly by querying the NRF 754. The selection of a set of network slice instances for the UE 702 may be triggered by the AMF 744 with which the UE 702 is registered by interacting with the NSSF 750, which may lead to a change of AMF. The NSSF 750 may interact with the AMF 744 via an N22 reference point: and may communicate with another NSSF in a visited network via an N31 reference point (not shown). Additionally, the NSSF 750 may exhibit an Nnssf service-based interface.

The NEF 752 may securely expose services and capabilities provided by 3GPP network functions for third party, internal exposure/re-exposure, AFs (e.g., AF 760), edge computing or fog computing systems, etc. In such embodiments, the NEF 752 may authenticate, authorize, or throttle the AFs. NEF 752 may also translate information exchanged with the AF 760 and information exchanged with internal network functions. For example, the NEF 752 may translate between an AF-Service-Identifier and an internal 5GC information. NEF 752 may also receive information from other NFs based on exposed capabilities of other NFs. This information may be stored at the NEF 752 as structured data, or at a data storage NF using standardized interfaces. The stored information can then be re-exposed by the NEF 752 to other NFs and AFs, or used for other purposes such as analytics. Additionally, the NEF 752 may exhibit an Nnef service-based interface.

The NRF 754 may support service discovery functions, receive NF discovery requests from NF instances, and provide the information of the discovered NF instances to the NF instances. NRF 754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 754 may exhibit the Nnrf service-based interface.

The PCF 756 may provide policy rules to control plane functions to enforce them, and may also support unified policy framework to govern network behavior. The PCF 756 may also implement a front end to access subscription information relevant for policy decisions in a UDR of the UDM 758. In addition to communicating with functions over reference points as shown, the PCF 756 exhibit an Npcf service-based interface.

The UDM 758 may handle subscription-related information to support the network entities handling of communication sessions, and may store subscription data of UE 702. For example, subscription data may be communicated via an N8 reference point between the UDM 758 and the AMF 744. The UDM 758 may include two parts, an application front end and a UDR. The UDR may store subscription data and policy data for the UDM 758 and the PCF 756, and/or structured data for exposure and application data (including PFDs for application detection, application request information for multiple UEs 702) for the NEF 752. The Nudr service-based interface may be exhibited by the UDR 221 to allow the UDM 758, PCF 756, and NEF 752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 758 may exhibit the Nudm service-based interface.

The AF 760 may provide application influence on traffic routing, provide access to NEF, and interact with the policy framework for policy control.

In some embodiments, the 5GC 740 may enable edge computing by selecting operator/3rd party services to be geographically close to a point that the UE 702 is attached to the network. This may reduce latency and load on the network. To provide edge-computing implementations, the 5GC 740 may select a UPF 748 close to the UE 702 and execute traffic steering from the UPF 748 to data network 736 via the N6 interface. This may be based on the UE subscription data, UE location, and information provided by the AF 760. In this way, the AF 760 may influence UPF (re)selection and traffic routing. Based on operator deployment, when AF 760 is considered to be a trusted entity, the network operator may permit AF 760 to interact directly with relevant NFs. Additionally, the AF 760 may exhibit an Naf service-based interface.

The data network 736 may represent various network operator services, Internet access, or third party services that may be provided by one or more servers including, for example, application/content server 738.

Figure 8:
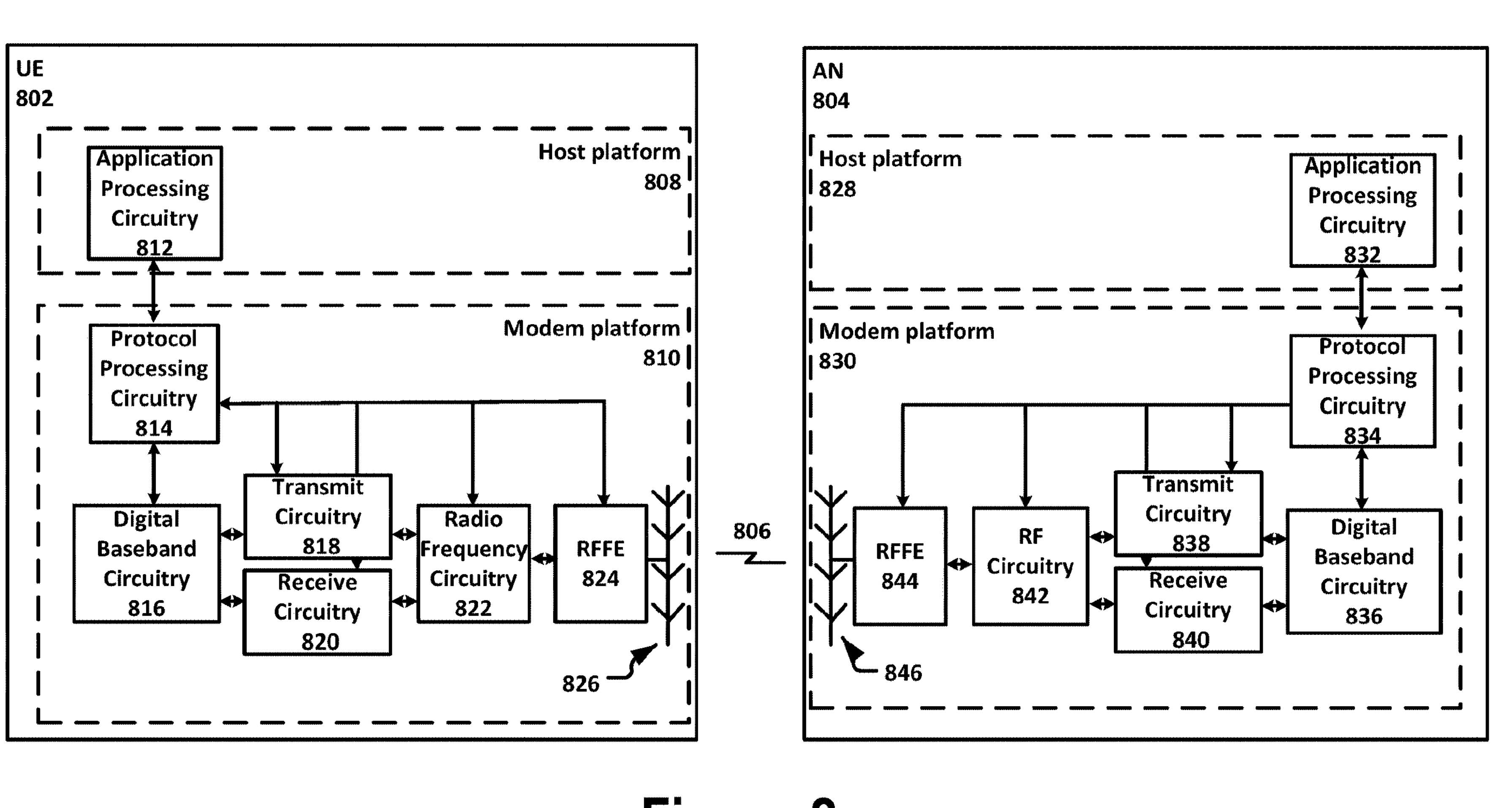
FIG. 8 schematically illustrates a wireless network 800 in accordance with various embodiments.

FIG. 8 schematically illustrates a wireless network 800 in accordance with various embodiments. The wireless network 800 may include a UE 802 in wireless communication with an AN 804. The UE 802 and AN 804 may be similar to, and substantially interchangeable with, like-named components described elsewhere herein.

The UE 802 may be communicatively coupled with the AN 804 via connection 806. The connection 806 is illustrated as an air interface to enable communicative coupling, and can be consistent with cellular communications protocols such as an LTE protocol or a 5G NR protocol operating at mmWave or sub-6 GHZ frequencies.

The UE 802 may include a host platform 808 coupled with a modem platform 810. The host platform 808 may include application processing circuitry 812, which may be coupled with protocol processing circuitry 814 of the modem platform 810. The application processing circuitry 812 may run various applications for the UE 802 that source/sink application data. The application processing circuitry 812 may further implement one or more layer operations to transmit/receive application data to/from a data network. These layer operations may include transport (for example UDP) and Internet (for example, IP) operations.

The protocol processing circuitry 814 may implement one or more of layer operations to facilitate transmission or reception of data over the connection 806. The layer operations implemented by the protocol processing circuitry 814 may include, for example, MAC, RLC, PDCP. RRC and NAS operations.

The modem platform 810 may further include digital baseband circuitry 816 that may implement one or more layer operations that are "below" layer operations performed by the protocol processing circuitry 814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 810 may further include transmit circuitry 818, receive circuitry 820, RF circuitry 822, and RF front end (RFFE) 824, which may include or connect to one or more antenna panels 826. Briefly, the transmit circuitry 818 may include a digital-to-analog converter, mixer, intermediate frequency (IF) components, etc.; the receive circuitry 820 may include an analog-to-digital converter, mixer, IF components, etc.; the RF circuitry 822 may include a low-noise amplifier, a power amplifier, power tracking components, etc.; RFFE 824 may include filters (for example, surface/bulk acoustic wave filters), switches, antenna tuners, beamforming components (for example, phase-array antenna components), etc. The selection and arrangement of the components of the transmit circuitry 818, receive circuitry 820, RF circuitry 822, RFFE 824, and antenna panels 826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 814 may include one or more instances of control circuitry (not shown) to provide control functions for the transmit/receive components.

A UE reception may be established by and via the antenna panels 826, RFFE 824, RF circuitry 822, receive circuitry 820, digital baseband circuitry 816, and protocol processing circuitry 814. In some embodiments, the antenna panels 826 may receive a transmission from the AN 804 by receive-beamforming signals received by a plurality of antennas/antenna elements of the one or more antenna panels 826.

A UE transmission may be established by and via the protocol processing circuitry 814, digital baseband circuitry 816, transmit circuitry 818, RF circuitry 822, RFFE 824, and antenna panels 826. In some embodiments, the transmit components of the UE 804 may apply a spatial filter to the data to be transmitted to form a transmit beam emitted by the antenna elements of the antenna panels 826.

Similar to the UE 802, the AN 804 may include a host platform 828 coupled with a modem platform 830. The host platform 828 may include application processing circuitry 832 coupled with protocol processing circuitry 834 of the modem platform 830. The modem platform may further include digital baseband circuitry 836, transmit circuitry 838, receive circuitry 840, RF circuitry 842, RFFE circuitry 844, and antenna panels 846. The components of the AN 804 may be similar to and substantially interchangeable with like-named components of the UE 802. In addition to performing data transmission/reception as described above, the components of the AN 808 may perform various logical functions that include, for example, RNC functions such as radio bearer management, uplink and downlink dynamic radio resource management, and data packet scheduling.

Figure 9:
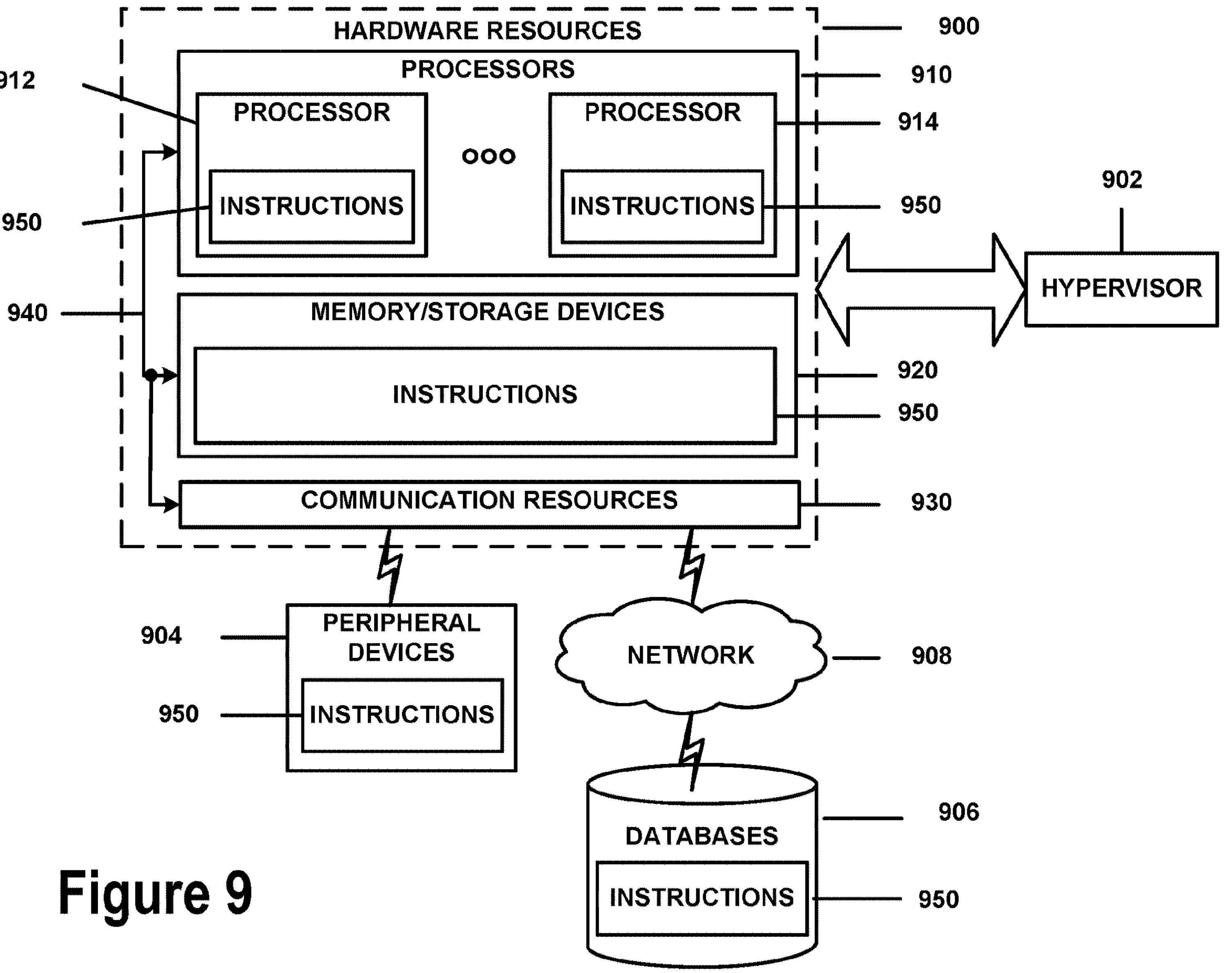
FIG. 9 is a block diagram illustrating components, according to some example embodiments, able to read instructions from a machine-readable or computer-readable medium (e.g., a non-transitory machine-readable storage medium) and perform any one or more of the methodologies discussed herein.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which may be communicatively coupled via a bus 940 or other interface circuitry. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processors 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface controllers, components, or other suitable devices to communicate with one or more peripheral devices 904 or one or more databases 906 or other network elements via a network 908. For example, the communication resources 930 may include wired communication components (e.g., for coupling via USB, Ethernet, etc.), cellular communication components, NFC components, Bluetooth®: (or Bluetooth® Low Energy) components, Wi-Fi R components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

Figure 10:
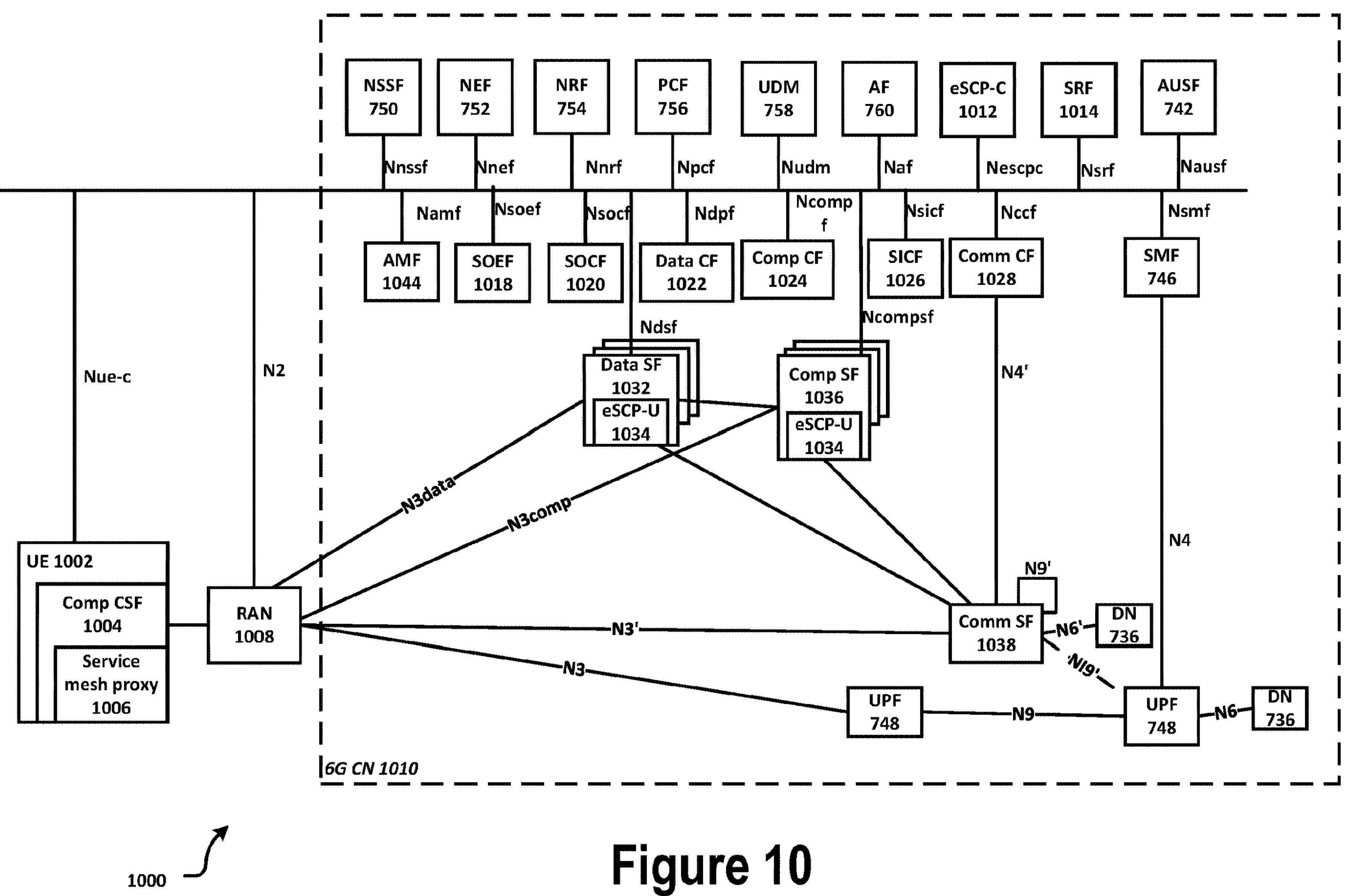
FIG. 10 illustrates a network in accordance with various embodiments.

FIG. 10 illustrates a network 1000 in accordance with various embodiments. The network 1000 may operate in a matter consistent with 3GPP technical specifications or technical reports for 6G systems. In some embodiments, the network 1000 may operate concurrently with network 700. For example, in some embodiments, the network 1000 may share one or more frequency or bandwidth resources with network 700. As one specific example, a UE (e.g., UE 1002) may be configured to operate in both network 1000 and network 700. Such configuration may be based on a UE including circuitry configured for communication with frequency and bandwidth resources of both networks 700 and 1000. In general, several elements of network 1000 may share one or more characteristics with elements of network 700. For the sake of brevity and clarity, such elements may not be repeated in the description of network 1000.

The network 1000 may include a UE 1002, which may include any mobile or non-mobile computing device designed to communicate with a RAN 1008 via an over-the-air connection. The UE 1002 may be similar to, for example, UE 702. The UE 1002 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 10, in some embodiments the network 1000 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 10, the UE 1002 may be communicatively coupled with an AP such as AP 706 as described with respect to FIG. 7. Additionally, although not specifically shown in FIG. 10, in some embodiments the RAN 1008 may include one or more ANss such as AN 708 as described with respect to FIG. 7. The RAN 1008 and/or the AN of the RAN 1008 may be referred to as a base station (BS), a RAN node, or using some other term or name.

The UE 1002 and the RAN 1008 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHZ and above frequency ranges. Such frequency ranges may additionally or alternatively be referred to as "millimeter wave" or "mmWave" frequency ranges.

The RAN 1008 may allow for communication between the UE 1002 and a 6G core network (CN) 1010. Specifically, the RAN 1008 may facilitate the transmission and reception of data between the UE 1002 and the 6G CN 1010. The 6G CN 1010 may include various functions such as NSSF 750, NEF 752, NRF 754, PCF 756, UDM 758, AF 760, SMF 746, and AUSF 742. The 6G CN 1010 may additional include UPF 748 and DN 736 as shown in FIG. 10.

Additionally, the RAN 1008 may include various additional functions that are in addition to, or alternative to, functions of a legacy cellular network such as a 4G or 5G network. Two such functions may include a Compute Control Function (Comp CF) 1024 and a Compute Service Function (Comp SF) 1036. The Comp CF 1024 and the Comp SF 1036 may be parts or functions of the Computing Service Plane. Comp CF 1024 may be a control plane function that provides functionalities such as management of the Comp SF 1036, computing task context generation and management (e.g., create, read, modify, delete), interaction with the underlaying computing infrastructure for computing resource management, etc., Comp SF 1036 may be a user plane function that serves as the gateway to interface computing service users (such as UE 1002) and computing nodes behind a Comp SF instance. Some functionalities of the Comp SF 1036 may include: parse computing service data received from users to compute tasks executable by computing nodes: hold service mesh ingress gateway or service API gateway; service and charging policies enforcement: performance monitoring and telemetry collection, etc. In some embodiments, a Comp SF 1036 instance may serve as the user plane gateway for a cluster of computing nodes. A Comp CF 1024 instance may control one or more Comp SF 1036 instances.

Two other such functions may include a Communication Control Function (Comm CF) 1028 and a Communication Service Function (Comm SF) 1038, which may be parts of the Communication Service Plane. The Comm CF 1028 may be the control plane function for managing the Comm SF 1038, communication sessions creation/configuration/releasing, and managing communication session context. The Comm SF 1038 may be a user plane function for data transport. Comm CF 1028 and Comm SF 1038 may be considered as upgrades of SMF 746 and UPF 748, which were described with respect to a 5G system in FIG. 7. The upgrades provided by the Comm CF 1028 and the Comm SF 1038 may enable service-aware transport. For legacy (e.g., 4G or 5G) data transport. SMF 746 and UPF 748 may still be used.

Two other such functions may include a Data Control Function (Data CF) 1022 and Data Service Function (Data SF) 1032 may be parts of the Data Service Plane. Data CF 1022 may be a control plane function and provides functionalities such as Data SF 1032 management, Data service creation/configuration/releasing. Data service context management, etc. Data SF 1032 may be a user plane function and serve as the gateway between data service users (such as UE 1002 and the various functions of the 6G CN 1010) and data service endpoints behind the gateway. Specific functionalities may include: parse data service user data and forward to corresponding data service endpoints, generate charging data, report data service status.

Another such function may be the Service Orchestration and Chaining Function (SOCF) 1020, which may discover, orchestrate and chain up communication/computing/data services provided by functions in the network. Upon receiving service requests from users, SOCF 1020 may interact with one or more of Comp CF 1024, Comm CF 1028, and Data CF 1022 to identify Comp SF 1036, Comm SF 1038, and Data SF 1032 instances, configure service resources, and generate the service chain, which could contain multiple Comp SF 1036, Comm SF 1038, and Data SF 1032 instances and their associated computing endpoints. Workload processing and data movement may then be conducted within the generated service chain. The SOCF 1020 may also responsible for maintaining, updating, and releasing a created service chain.

Another such function may be the service registration function (SRF) 1014, which may act as a registry for system services provided in the user plane such as services provided by service endpoints behind Comp SF 1036 and Data SF 1032 gateways and services provided by the UE 1002. The SRF 1014 may be considered a counterpart of NRF 754, which may act as the registry for network functions.

Other such functions may include an evolved service communication proxy (eSCP) and service infrastructure control function (SICF) 1026, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 1012 and eSCP-U 1034, for control plane service communication proxy and user plane service communication proxy, respectively. The SICF 1026 may control and configure eCSP instances in terms of service traffic routing policies, access rules, load balancing configurations, performance monitoring, etc.

Another such function is the AMF 1044. The AMF 1044 may be similar to 744, but with additional functionality. Specifically, the AMF 1044 may include potential functional repartition, such as move the message forwarding functionality from the AMF 1044 to the RAN 1008.

Another such function is the service orchestration exposure function (SOEF) 1018. The SOEF may be configured to expose service orchestration and chaining services to external users such as applications.

The UE 1002 may include an additional function that is referred to as a computing client service function (comp CSF) 1004. The comp CSF 1004 may have both the control plane functionalities and user plane functionalities, and may interact with corresponding network side functions such as SOCF 1020, Comp CF 1024, Comp SF 1036, Data CF 1022, and/or Data SF 1032 for service discovery, request/response, compute task workload exchange, etc. The Comp CSF 1004 may also work with network side functions to decide on whether a computing task should be run on the UE 1002, the RAN 1008, and/or an element of the 6G CN 1010.

The UE 1002 and/or the Comp CSF 1004 may include a service mesh proxy 1006. The service mesh proxy 1006 may act as a proxy for service-to-service communication in the user plane. Capabilities of the service mesh proxy 1006 may include one or more of addressing, security, load balancing, etc.

Example Procedures

Figure 11:
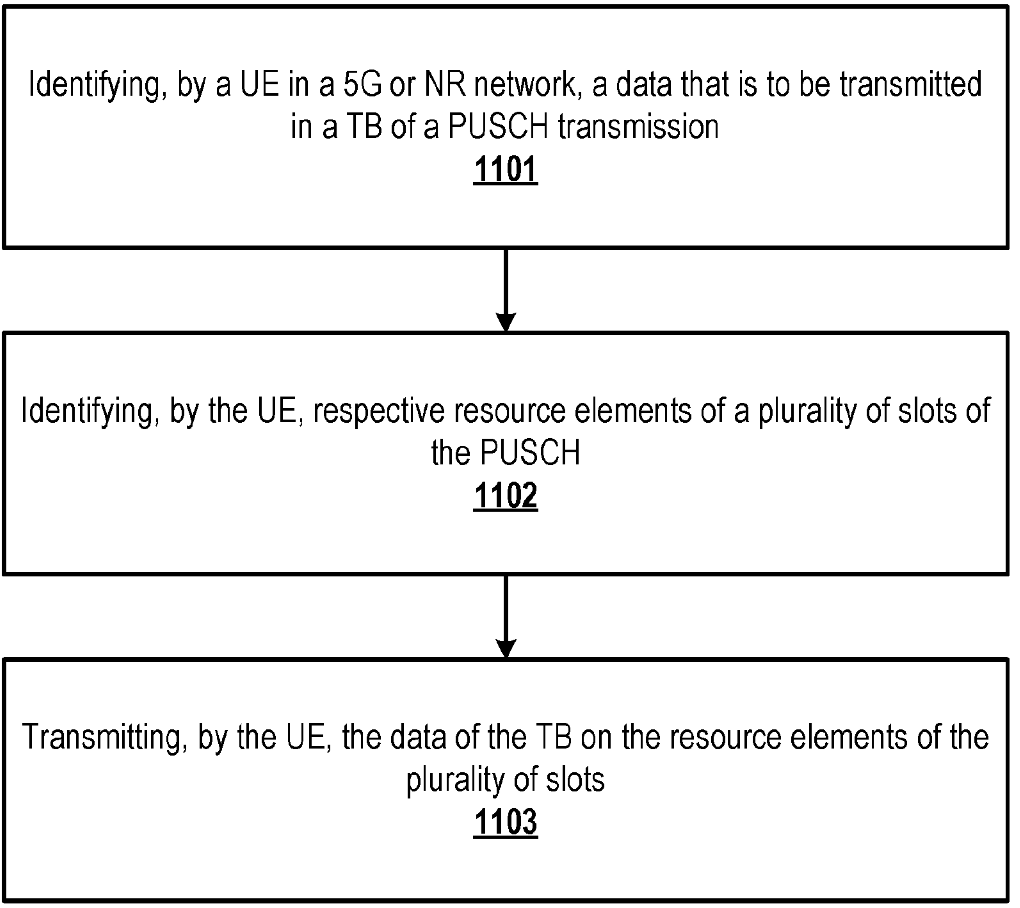
FIG. 11 depicts an example procedure for practicing the various embodiments discussed herein.

In some embodiments, the electronic device(s), network (s), system(s), chip(s) or component(s), or portions or implementations thereof, of FIG. 7-10, or some other figure herein, may be configured to perform one or more processes, techniques, or methods as described herein, or portions thereof. One such process is depicted in FIG. 11. For example, the process may include, at 1101, identifying, by a user equipment (UE) in a fifth generation (5G) or new radio (NR) network, a data that is to be transmitted in a transport block (TB) of a physical uplink shared channel (PUSCH) transmission. The UE may be similar to, for example, UE 802, and the identifying may be performed by, for example, baseband circuitry such as baseband circuitry 816.

The process may further include, at 1102, identifying, by the UE, respective resource elements of a plurality of slots of the PUSCH. The identification may be performed by, for example, baseband circuitry such as baseband circuitry 816.

The process may further include, at 1103, transmitting, by the UE, the data of the TB on the resource elements of the plurality of slots. Such transmission may be performed or facilitated by one or more of the baseband circuitry 816, RF circuitry 822, RFFE 824, or some other element of UE 802.

Figure 12:
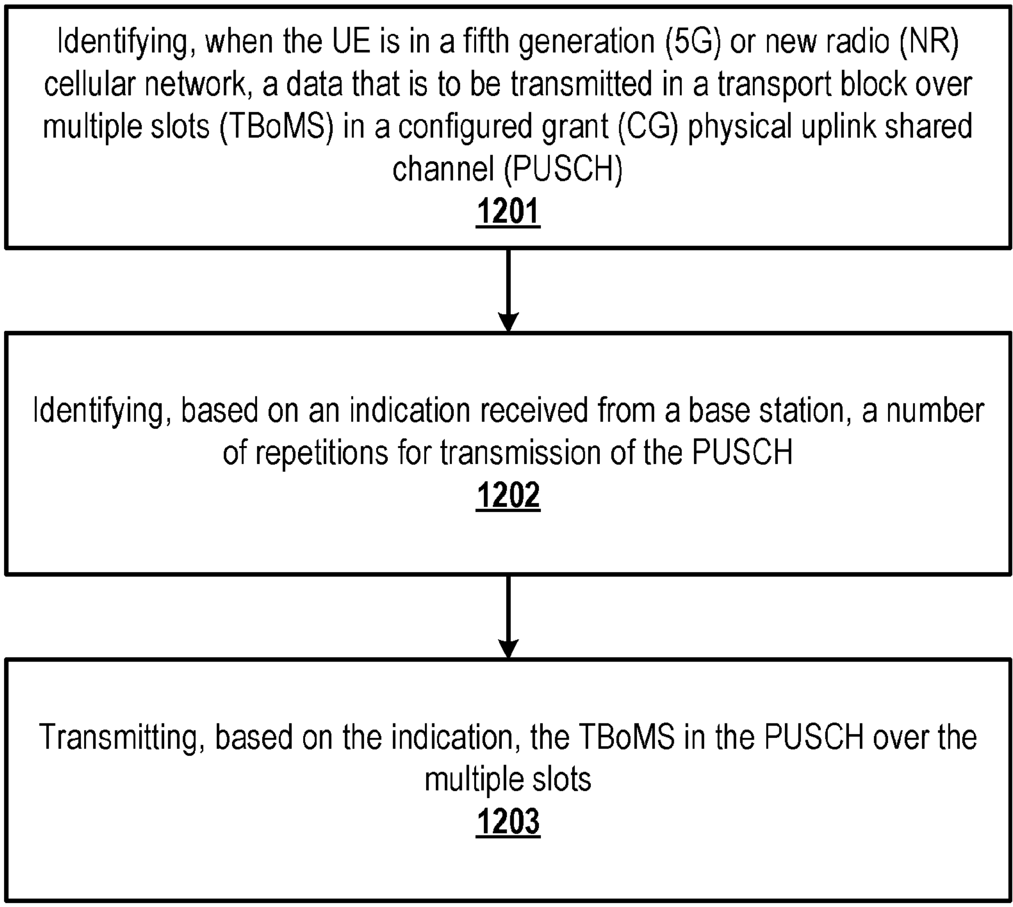
FIG. 12 depicts an alternative example procedure for practicing the various embodiments discussed herein.

Another such process is depicted in FIG. 12 For example, the process may include, at 1201, identifying, when the UE is in a fifth generation (5G) or new radio (NR) cellular network, a data that is to be transmitted in a transport block over multiple slots (TBoMS) in a configured grant (CG) physical uplink shared channel (PUSCH). The UE may be similar to, for example, UE 802, and the identifying may be performed by, for example, baseband circuitry such as baseband circuitry 816.

The process may further include, at 1202, identifying, based on an indication received from a base station, a number of repetitions for transmission of the PUSCH. The identification may be performed by, for example, baseband circuitry such as baseband circuitry 816.

The process may further include, at 1203, transmitting, based on the indication, the TBoMS in the PUSCH over the multiple slots. Such transmission may be performed or facilitated by one or more of the baseband circuitry 816, RF circuitry 822, RFFE 824, or some other element of UE 802.

Another such process is depicted in FIG. 13. For example, the process may include, at 1301, transmitting, to a user equipment (UE) an indication of a number of repetitions for transmission of a configured grant (CG) physical uplink shared channel (PUSCH) that includes a transmission of a transport block over multiple slots (TBoMS). The UE may be similar to, for example, UE 802. The process of FIG. 13 may be performed by a base station which may be similar to, for example, access node 804 of FIG. 8. The transmitting may be performed or facilitated by one or more of the baseband circuitry 836, RF circuitry 842, RFFE 844, or some other element of the access node 804.

The process may further include, at 1302, identifying, based on the indication, received transmissions of the PUSCH in the multiple slots. Such identification may be performed or facilitated by, for example, baseband circuitry 836 or some other element of the access node 804.

For one or more embodiments, at least one of the components set forth in one or more of the preceding figures may be configured to perform one or more operations, techniques, processes, and/or methods as set forth in the example section below. In some embodiments, elements of the Figures may be performed in a different order than depicted. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the system and method of wireless communication for a fifth generation (5G) or new radio (NR) system: configured by, gNodeB (gNB), a number of repetitions for configured grant based physical uplink shared channel (PUSCH) with a transport block (TB) processing over multiple slots (TBoMS), terminated, by UE, the repetition(s) of the TBoMS transmission at the last whole transmission occasion within the period for the configured grant based TBoMS.

Example 2 may include the method of example 1 or some other example herein, wherein for configured grant based TBoMS transmission, the repetitions shall be terminated after transmitting K TBoMS repetitions, or at the last whole transmission occasion among the K repetitions within the period P, or from the starting symbol of the repetition that overlaps with a PUSCH with the same HARQ process scheduled by DCI format 0_0, 0_1 or 0_2, whichever is reached first.

Example 3 may include the method of example 1 or some other example herein, wherein for configured grant based TBoMS transmission, the repetitions shall be terminated after transmitting K repetitions, or at the last transmission occasion among the K repetitions with a slot within the period P, or from the starting symbol of the repetition that overlaps with a PUSCH with the same HARQ process scheduled by DCI format 0_0, 0_1 or 0_2, whichever is reached first.

Example 4 may include the method of example 1 or some other example herein, wherein when Aperiodic channel state information (A-CSI) report is triggered and multiplexed on TBoMS with uplink shared channel (UL-SCH), A-CSI report is multiplexed only on the first slot of the TBoMS transmission: where the amount of resources allocated for A-CSI on the first slot of the TBoMS transmission is determined in accordance with the number of REs allocated for each slot.

Example 5 may include the method of example 1 or some other example herein, wherein when A-CSI report is triggered and multiplexed on TBoMS with UL-SCH, the amount of resources allocated for A-CSI on TBoMS transmission is determined in accordance with the number of REs allocated for all the allocated slots for TBoMS transmission.

Example 6 may include the method of example 1 or some other example herein, wherein an upper limit can be defined to allow the A-CSI only on the first slot of TBoMS, wherein the upper limit can be configured by higher layers via remaining minimum system information (RMSI) or dedicated radio resource control (RRC) signalling or determined in accordance with the amount of REs allocated for TBoMS transmission in a slot.

Example 7 may include the method of example 1 or some other example herein, wherein when A-CSI report is triggered and multiplexed on TBoMS with UL-SCH, the amount of resources allocated for A-CSI on TBoMS transmission is determined in accordance with the number of REs allocated for all the allocated slots for TBoMS transmission, wherein the number of REs for A-CSI is equally spread into allocated slots for TBoMS transmission.

Example 8 may include the method of example 1 or some other example herein, wherein the number of REs for A-CSI is equally spread into allocated slots for TBoMS transmission; wherein the number of REs for A-CSI in each slot is determined in accordance with the number of REs allocated for TBoMS in each slot.

Example 9 may include the method of example 1 or some other example herein, wherein when A-CSI report is multiplexed on TBoMS without UL-SCH, i.e., when UL-SCH indicator is indicated as "0", A-CSI report is only multiplexed on the TBoMS in the first slot: wherein the remaining slots allocated for TBoMS transmission are dropped.

Example 10 may include the method of example 1 or some other example herein, wherein when UL-SCH is not present number of slots used for A-CSI report within configured/indicated number of slots for TBoMS transmission can be configured by higher layers via RMSI or RRC signaling or dynamically indicated in the DCI or a combination thereof.

Example 11 may include the method of example 1 or some other example herein, wherein when A-CSI report is multiplexed on TBoMS without UL-SCH, i.e., when UL-SCH indicator is indicated as "0", A-CSI report is multiplexed on the all the available slots allocated for TBoMS.

Example 12 may include the method of example 1 or some other example herein, wherein when repetition is configured/indicated for the TBoMS transmission, when UL-SCH is present, A-CSI is only multiplexed on the first repetition of TBoMS transmission.

Example 13 may include the method of example 1 or some other example herein, wherein when UL-SCH is not present, A-CSI is only transmitted on the first repetition of TBoMS transmission.

Example 14 may include the method of example 1 or some other example herein, wherein UE is not expected to be triggered with TBoMS transmission together with A-CSI report.

Example 15 may include the method of example 1 or some other example herein, wherein when semi-persistent channel state information (SP-CSI) is activated, UE is not expected to be triggered with TBoMS transmission together with SP-CSI report.

Example 16 may include the method of example 1 or some other example herein, wherein when SP-CSI is activated with TBoMS transmission without repetition, SP-CSI is only transmitted on the TBoMS in the first slot: wherein the remaining slots allocated for TBoMS transmission are dropped.

Example 17 may include the method of example 1 or some other example herein, wherein when SP-CSI is activated with TBoMS transmission without repetition, SP-CSI is transmitted on the TBoMS in all slots for a single TBoMS transmission.

Example 18 may include may include the method of example 1 or some other example herein, wherein in case of uplink skipping. UE is not expected that PUSCH skipping (including both enhancedSkipUplinkTxDynamic-r16 and enhancedSkipUplinkTxConfigured-r16) and TBoMS are enabled together when Rel-16 LCH based prioritization is not configured and there is a single PHY priority for UL transmissions.

Example 19 may include the method of example 1 or some other example herein, wherein minimum UE processing timelines between UL grant and start of the PUSCH, or for multiplexing of UCI to PUSCH, or for cancelation of the PUSCH, the starting symbol of the PUSCH may be defined based on the first symbol in the first available slot for the TBoMS based PUSCH.

Example 20 may include the method of example 1 or some other example herein, wherein dynamic physical uplink control channel (PUCCH) repetition factor indication is applied for the case when a PUCCH resource is determined or associated with a corresponding downlink control information (DCI).

Example 21 may include the method of examples 1 or 20, or some other example herein, wherein dynamic PUCCH repetition factor indication is applied for the case when the repetition factor is configured per PUCCH resource.

Example 22 may include the method of examples 1 or 20, or some other example herein, wherein dynamic PUCCH repetition factor indication is applied for the case when the PUCCH resource is indicated by a PUCCH resource indicator (PRI) and/or a starting control channel element (CCE) index of the corresponding physical downlink control channel (PDCCH) transmission.

Example 23 may include the method of any of examples 20-22, or some other example herein, wherein a PUCCH resource is determined if a PUCCH carrying dynamic HARQ-ACK feedback overlaps with a PUCCH resource carrying periodic channel state information (P-CSI) and/or semi-persistent CSI (SP-CSI) and/or scheduling request (SR) and/or semi-static HARQ-ACK feedback.

Example 24 may include the method of example 23, or some other example herein, wherein dynamic HARQ-ACK feedback may include one or more of the following:

HARQ-ACK feedback in response to PDSCH scheduled by a DCI

HARQ-ACK for the first semi-persistent scheduling (SPS) PDSCH associated with the activation DCI.

HARQ-ACK corresponding to the SPS Release DCI

Example 25 may include the method of example 24, or some other example herein, wherein semi-static HARQ-ACK feedback may include, but not limited to: HARQ-ACK feedback for the SPS PDSCH which is not associated with a DCI.

Example 26 includes a method comprising: identifying, by a user equipment (UE) in a fifth generation (5G) or new radio (NR) network, a data that is to be transmitted in a transport block (TB) of a physical uplink shared channel (PUSCH) transmission: identifying, by the UE, respective resource elements of a plurality of slots of the PUSCH; and transmitting, by the UE, the data of the TB on the resource elements of the plurality of slots.

Example 27 includes the method of example 26, or some other example herein, wherein data of the TB in a first slot of the plurality of slots is different than data of the TB in a second slot of the plurality of slots.

Example 28 includes the method of example 26, or some other example herein, wherein the data is uplink control information (UCI) data that includes aperiodic channel state information (A-CSI) data.

Example 29 includes the method of example 28, or some other example herein, wherein the A-CSI data is only transmitted in one slot of the plurality of slots.

Example 30 includes the method of example 28, or some other example herein, wherein the A-CSI data is transmitted in at least two slots of the plurality of slots.

Example 31 includes the method of example 28, or some other example herein, wherein the A-CSI data is the only data of the TB transmitted in a slot of the plurality of slots.

Example 32 includes the method of example 26, or some other example herein, further comprising repeating, by the UE, transmission of the data of the TB on resource elements of a second plurality of slots.

Example 32 includes the method of example 26, or some other example herein, wherein the identifying the resource elements is based on an indication received from a base station of the 5G or NR network.

Example A1 includes an apparatus for use in a user equipment (UE), wherein the apparatus comprises: one or more processors; and one or more non-transitory computer readable media comprising instruction that, upon execution of the instructions by the one or more processors, are to cause the UE to: identify, when the UE is in a fifth generation (5G) or new radio (NR) cellular network, a data that is to be transmitted in a transport block over multiple slots (TBoMS) in a configured grant (CG) physical uplink shared channel (PUSCH): identify, based on an indication received from a base station, a number of repetitions for transmission of the PUSCH; and transmit, based on the indication, the TBoMS in the PUSCH over the multiple slots.

Example A2 includes the apparatus of example A1, and/or some other example herein, wherein a PUSCH in a first slot of the multiple slots is different than a PUSCH of a second slot of the multiple slots.

Example A3 includes the apparatus of any of examples A1-A2, and/or some other example herein, wherein the instructions are further to repeat transmission of the TBoMS in a CG PUSCH in second multiple slots.

Example A4 includes the apparatus of any of examples A1-A3, and/or some other example herein, wherein the data includes uplink control information (UCI) that includes aperiodic channel state information (A-CSI).

Example A5 includes the apparatus of example A4, and/or some other example herein, wherein the A-CSI is only transmitted in one slot of the multiple slots.

Example A6 includes the apparatus of example A4, and/or some other example herein, wherein the A-CSI is transmitted in at least two slots of the multiple slots.

Example A7 includes the apparatus of example A4, and/or some other example herein, wherein the A-CSI is the only data of a slot of the multiple slots.

Example A8 includes the apparatus of any of examples A1-A7, and/or some other example herein, wherein the multiple slots are terminated at a last slot with a period that is related to the CG PUSCH transmission.

Example A9 includes one or more non-transitory computer readable media comprising instruction that, upon execution of the instructions by the one or more processors, are to cause the UE to: identify, when the UE is in a fifth generation (5G) or new radio (NR) cellular network, a data that is to be transmitted in a transport block over multiple slots (TBoMS) in a configured grant (CG) physical uplink shared channel (PUSCH); identify, based on an indication received from a base station, a number of repetitions for transmission of the PUSCH: and transmit, based on the indication, the TBoMS in the PUSCH over the multiple slots.

Example A10 includes the one or more non-transitory computer-readable media of example A9, and/or some other example herein, wherein a first slot of the multiple slots has different data than data of a second slot of the multiple slots.

Example A11 includes the one or more non-transitory computer-readable media of any of examples A9-A10, and/ or some other example herein, wherein the data includes uplink control information (UCI) that includes aperiodic channel state information (A-CSI).

Example A12 includes the one or more non-transitory computer-readable media of example A11, and/or some other example herein, wherein the A-CSI is only transmitted in a first slot of the multiple slots.

Example A13 includes the one or more non-transitory computer-readable media of any of examples A9-A12, and/or some other example herein, wherein the instructions are further to repeat transmission of the TBoMS in a CG PUSCH in second multiple slots.

Example A14 includes the one or more non-transitory computer-readable media of any of examples A9-A13, and/or some other example herein, wherein the multiple slots are terminated at a last slot with a period that is related to the CG PUSCH transmission.

Example A15 includes an apparatus for use in a base station, wherein the apparatus comprises: one or more processors; and one or more non-transitory computer readable media comprising instruction that, upon execution of the instructions by the one or more processors, are to cause the base station to: transmit, to a user equipment (UE) an indication of a number of repetitions for transmission of a configured grant (CG) physical uplink shared channel (PUSCH) that includes a transmission of a transport block over multiple slots (TBoMS); and identify, based on the indication, received transmissions of the PUSCH in the multiple slots.

Example A16 includes the apparatus of example A15, and/or some other example herein, wherein a PUSCH in a first slot of the multiple slots has different data than a PUSCH in a second slot of the multiple slots.

Example A17 includes the apparatus of any of examples A15-A16, and/or some other example herein, wherein a second slot of the multiple slots has same data as a PUSCH of a second slot of the multiple slots.

Example A18 includes the apparatus of any of examples A15-A17, wherein the transmission of the TBoMS includes uplink control information (UCI) that includes aperiodic channel state information (A-CSI).

Example A19 includes the apparatus of example A18, and/or some other example herein, wherein the A-CSI is only transmitted in a first slot of the multiple slots.

Example A20 includes the apparatus of any of examples A15-A19, wherein the multiple slots are terminated at a last slot with a period that is related to the CG PUSCH transmission.

Example B1 includes an apparatus for use in a user equipment (UE), wherein the apparatus comprises: one or more processors; and one or more non-transitory computer readable media comprising instruction that, upon execution of the instructions by the one or more processors, are to cause the UE to: identify, when the UE is in a fifth generation (5G) or new radio (NR) cellular network, a data that is to be transmitted in a transport block over multiple slots (TBoMS) in a configured grant (CG) physical uplink shared channel (PUSCH): identify, based on an indication received from a base station, a number of repetitions for transmission of the PUSCH; and transmit, based on the indication, the TBoMS in the PUSCH over the multiple slots.

Example B2 includes the apparatus of example B1, and/or some other example herein, wherein aperiodic channel state information (A-CSI) and data of a transport block are transmitted in a slot of the multiple slots of the TBoMS.

Example B3 includes the apparatus of example B2, and/or some other example herein, wherein the A-CSI is only transmitted on the first slot of the multiple slots.

Example B4 includes the apparatus of example B2, and/or some other example herein, wherein the A-CSI is transmitted in at least two slots of the multiple slots.

Example B5 includes the apparatus of example B2, and/or some other example herein, wherein transmission of the A-CSI is based on identification, by the UE, of a downlink control information (DCI) format of a DCI received from the base station.

Example B6 includes the apparatus of example B5, and/or some other example herein, wherein the DCI format is DCI format 0_1 or 0_2.

Example B7 includes the apparatus of example B2, and/or some other example herein, wherein data is transmitted on remaining ones of the multiple slots of the TBoMS.

Example B8 includes the apparatus of any of example B1-B7, and/or some other example herein, wherein the multiple slots are terminated at a last slot with a period that is related to the CG PUSCH transmission.

Example B9 includes one or more non-transitory computer readable media comprising instruction that, upon execution of the instructions by the one or more processors, are to cause the UE to: identify, when the UE is in a fifth generation (5G) or new radio (NR) cellular network, a data that is to be transmitted in a transport block over multiple slots (TBoMS) in a configured grant (CG) physical uplink shared channel (PUSCH); identify, based on an indication received from a base station, a number of repetitions for transmission of the PUSCH: and transmit, based on the indication, the TBoMS in the PUSCH over the multiple slots.

Example B10 includes the one or more non-transitory computer-readable media of example B9, and/or some other example herein, wherein a first slot of the multiple slots has different data than data of a second slot of the multiple slots.

Example B11 includes the one or more non-transitory computer-readable media of any of examples B9-B10, and/or some other example herein, wherein aperiodic channel state information (A-CSI) and data of a transport block are transmitted in a slot of the multiple slots of the TBoMS.

Example B12 includes the one or more non-transitory computer-readable media of example B11, and/or some other example herein, wherein the A-CSI is transmitted in a first slot of the multiple slots.

Example B13 includes the one or more non-transitory computer-readable media of example B11, and/or some other example herein, wherein transmission of the A-CSI is based on identification of a downlink control information (DCI) format of a DCI received from the base station.

Example B14 includes the one or more non-transitory computer-readable media of any of examples B9-B12, and/or some other example herein, wherein the multiple slots are terminated at a last slot with a period that is related to the CG PUSCH transmission.

Example B15 includes an apparatus for use in a base station, wherein the apparatus comprises: one or more processors; and one or more non-transitory computer readable media comprising instruction that, upon execution of the instructions by the one or more processors, are to cause the base station to: transmit, to a user equipment (UE) an indication of a number of repetitions for transmission of a configured grant (CG) physical uplink shared channel (PUSCH) that includes a transmission of a transport block over multiple slots (TBoMS); and identify, based on the indication, received transmissions of the PUSCH in the multiple slots.

Example B16 includes the apparatus of example B15, and/or some other example herein, wherein the TBoMS includes aperiodic channel state information (A-CSI) and data of the transport block.

Example B17 includes the apparatus of example B16, and/or some other example herein, wherein the A-CSI and the data are transmitted in a first slot of the multiple slots, and data is transmitted in remaining slots of the multiple slots, and the A-CSI is not transmitted in the remaining slots.

Example B18 includes the apparatus of example B16, and/or some other example herein, wherein transmission of the A-CSI is based on a downlink control information (DCI) format of a DCI transmitted by the base station.

Example B19 includes the apparatus of example B18, and/or some other example herein, wherein the DCI format is DCI format 0_1 or DCI format 0_2.

Example B20 includes the apparatus of any of examples B15-B19, and/or some other example herein, wherein the multiple slots are terminated at a last slot with a period that is related to the CG PUSCH transmission.

Example Z01 may include an apparatus comprising means to perform one or more elements of a method described in or related to any of examples 1-32, A1-A20, B1-B20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-32, A1-A20, B1-B20, or any other method or process described herein.

Example Z03 may include an apparatus comprising logic, modules, or circuitry to perform one or more elements of a method described in or related to any of examples 1-32, A1-A20, B1-B20, or any other method or process described herein.

Example Z04 may include a method, technique, or process as described in or related to any of examples 1-32, A1-A20, B1-B20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-32, A1-A20, B1-B20, or portions thereof.

Example Z06 may include a signal as described in or related to any of examples 1-32, A1-A20, B1-B20, or portions or parts thereof.

Example Z07 may include a datagram, packet, frame, segment, protocol data unit (PDU), or message as described in or related to any of examples 1-32, A1-A20, B1-B20, or portions or parts thereof, or otherwise described in the present disclosure.

Example Z08 may include a signal encoded with data as described in or related to any of examples 1-32, A1-A20, B1-B20, or portions or parts thereof, or otherwise described in the present disclosure.

Example Z09 may include a signal encoded with a datagram, packet, frame, segment, protocol data unit (PDU), or message as described in or related to any of examples 1-32, A1-A20, B1-B20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-32, A1-A20, B1-B20, or portions thereof.

Example Z11 may include a computer program comprising instructions, wherein execution of the program by a processing element is to cause the processing element to carry out the method, techniques, or process as described in or related to any of examples 1-32, A1-A20, B1-B20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |

-continued

| | |
|---|---|
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital Expenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |

-continued

| | |
|---|---|
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP F1 | Application Protocol |
| F1-C F1 | Control plane interface |
| F1-U F1 | User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnay a Sputnikovaya Sistema (Engl.: Global Navigation Satellite System) |

-continued

| | |
|---|---|
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIAM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |

-continued

| | |
|---|---|
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |

-continued

| | |
|---|---|
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |

-continued

| | |
|---|---|
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |

-continued

| | |
|---|---|
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |

-continued

| | |
|---|---|
| TAI | Tracking Area Identity |
| TAU | Tracking Area Update |
| TB | Transport Block |
| TBS | Transport Block Size |
| TBD | To Be Defined |
| TCI | Tramsnission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry." as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance." "computer appliance." or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An apparatus for use in a user equipment (UE) configured for operation in a fifth generation (5G) new radio (NR) network (5G NR), wherein the apparatus comprises:

memory to store data that is to be transmitted in a transport block over multiple slots (TBoMS) in a configured grant (CG) physical uplink shared channel (PUSCH); and one or more processors configured to:

identify, based on an indication received from a base station, a number of repetitions for transmission of the CG PUSCH;

facilitate, based on the indication, transmission of the TBoMS in the CG PUSCH over the multiple slots;

terminate transmission of the repetitions of the TBoMS in the CG PUSCH over the multiple slots if a repetition of the TBoMS overlaps in a first slot that is scheduled with a dynamically granted (DG) PUSCH having a same Hybrid Automatic Repeat Request (HARQ) process ID as the CG PUSCH; and multiplex HARQ acknowledge (HARQ-ACK) feedback with aperiodic channel state information (A-CSI) for transmission in the first slot when the repetition of the TBoMS overlaps in the first slot that is scheduled with the DG PUSCH, wherein an overlap is determined when one or more symbols of the DG PUSCH are scheduled in one more symbols that occur within an overall duration of the repetition of the TBOMS.

2. The apparatus of claim 1, wherein the A-CSI is only transmitted during the first slot of the multiple slots.

3. The apparatus of claim 2, wherein transmission of the A-CSI is based on identification, by the UE, of a downlink control information (DCI) format of a DCI received from the base station.

4. The apparatus of claim 3, wherein the DCI format is DCI format 0_1 or 0_2.

5. The apparatus of claim 2, wherein the data is transmitted on remaining ones of the multiple slots of the TBoMS.

6. One or more non-transitory computer-readable media comprising instruction that, upon execution of the instructions by one or more processors, are to cause a User Equipment (UE) to:

identify, when the UE is in a fifth generation (5G) or new radio (NR) cellular network, a data that is to be transmitted in a transport block over multiple slots (TBoMS) in a configured grant (CG) physical uplink shared channel (PUSCH);

identify, based on an indication received from a base station, a number of repetitions for transmission of the PUSCH; and transmit, based on the indication, the TBoMS in the PUSCH over the multiple slots;

terminate transmission of the repetitions of the TBoMS in the CG PUSCH over the multiple slots if a repetition of the TBoMS overlaps in a first slot that is scheduled with a dynamically granted (DG) PUSCH having a same Hybrid Automatic Repeat Request (HARQ) process ID as the CG PUSCH; and multiplex HARQ acknowledge (HARQ-ACK) feedback with aperiodic channel state information (A-CSI) for transmission in the first slot when the repetition of the TBoMS overlaps in the first slot that is scheduled with the DG PUSCH, wherein an overlap is determined when one or more symbols of the DG PUSCH are scheduled in one more symbols that occur within an overall duration of the repetition of the TBOMS.

7. The one or more non-transitory computer-readable media of claim 6, wherein the A-CSI is only transmitted during the first slot of the multiple slots.

8. The one or more non-transitory computer-readable media of claim 7, wherein transmission of the A-CSI is based on identification of a downlink control information (DCI) format of a DCI received from the base station.

9. An apparatus for use in a base station, wherein the apparatus comprises:

one or more processors; and one or more non-transitory computer readable media comprising instruction that, upon execution of the instructions by the one or more processors, are to cause the base station to:

transmit, to a user equipment (UE) an indication of a number of repetitions for transmission of a configured grant (CG) physical uplink shared channel (PUSCH) that includes a transmission of a transport block over multiple slots (TBoMS); and identify, based on the indication, received transmissions of the PUSCH in the multiple slots, wherein transmission of the repetitions of the TBoMS in the CG PUSCH over the multiple slots is terminated by the UE if a repetition of the TBoMS overlaps in a first slot that is scheduled with a dynamically granted (DG) PUSCH having a same Hybrid Automatic Repeat Request (HARQ) process ID as the CG PUSCH; and wherein the base station is configured to receive HARQ acknowledge (HARQ-ACK) feedback multiplexed with aperiodic channel state information (A-CSI) in the first slot when the repetition of the TBoMS overlaps in the first slot that is scheduled with the DG PUSCH, wherein an overlap is determined when one or more symbols of the DG PUSCH are scheduled in one more symbols that occur within an overall duration of the repetition of the TBOMS.

10. The apparatus of claim 9, wherein the A-CSI is only received from the UE in the first slot.

11. The apparatus of claim 10, wherein data is received from the UE in remaining slots of the multiple slots, and the A-CSI is not received from the UE in the remaining slots.

12. The apparatus of claim 10, wherein transmission of the A-CSI by the UE is based on a downlink control information (DCI) format of a DCI transmitted by the base station.

13. The apparatus of claim 12, wherein the DCI format is DCI format 0_1 or DCI format 0_2.

* * * * *